(12) United States Patent
Yamanari et al.

(10) Patent No.: US 11,434,341 B2
(45) Date of Patent: Sep. 6, 2022

(54) RESIN SHEET AND ADHESIVE-LAYER-HAVING RESIN SHEET

(71) Applicant: NITTO DENKO CORPORATION, Ibaraki (JP)

(72) Inventors: Yusuke Yamanari, Ibaraki (JP); Makoto Saito, Ibaraki (JP); Akira Hirao, Ibaraki (JP); Kenji Furuta, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 10 days.

(21) Appl. No.: 16/638,340

(22) PCT Filed: Aug. 7, 2018

(86) PCT No.: PCT/JP2018/029569
§ 371 (c)(1),
(2) Date: Feb. 11, 2020

(87) PCT Pub. No.: WO2019/044422
PCT Pub. Date: Mar. 7, 2019

(65) Prior Publication Data
US 2020/0224000 A1 Jul. 16, 2020

(30) Foreign Application Priority Data

Aug. 28, 2017 (JP) .............................. JP2017-163083
Jul. 31, 2018 (JP) .................................. 2018-143561

(51) Int. Cl.
*C08J 9/00* (2006.01)
*C09J 7/38* (2018.01)
(Continued)

(52) U.S. Cl.
CPC ............. *C08J 9/0061* (2013.01); *C08J 9/103* (2013.01); *C08J 9/122* (2013.01); *C09J 7/26* (2018.01);
(Continued)

(58) Field of Classification Search
None
See application file for complete search history.

(56) References Cited

U.S. PATENT DOCUMENTS 4,915,984 A 4/1990 Murakami
9,040,598 B2 5/2015 Scholl et al.
(Continued)

FOREIGN PATENT DOCUMENTS

CN 105121529 A 12/2015
JP 61-275116 A 12/1986
(Continued)

OTHER PUBLICATIONS

Kodama, K. et al., Resin Foam and Foam Component, Jan. 16, 2014, machine translation of JP2014-005445A (Year: 2014).*
(Continued)

*Primary Examiner* — Chinessa T. Golden
(74) *Attorney, Agent, or Firm* — Sughrue Mion, PLLC

(57) ABSTRACT

A resin sheet with a pressure-sensitive adhesive layer including the resin sheet. The resin sheet including a main surface A and a main surface B opposite to each other across a thickness "d", where the resin sheet has a 50% compression load of 20 N/cm² or less at 23±5° C. in a direction of the thickness "d", which is measured in conformity with a method of measuring a compression hardness described in JIS K 6767:1999; where the resin sheet has a Poisson's ratio at 23° C. of 0.10 or less; and the resin sheet has a thickness recovery ratio of 40% or more when compressed by 20% in the direction of the thickness "d" at 23° C.

7 Claims, 3 Drawing Sheets

(51) Int. Cl.
*C09J 7/26* (2018.01)
*C08J 9/10* (2006.01)
*C08J 9/12* (2006.01)
*C09J 11/04* (2006.01)

(52) U.S. Cl.
CPC ............... *C09J 7/38* (2018.01); *C09J 11/04* (2013.01); *C08J 2205/044* (2013.01); *C08J 2207/02* (2013.01); *C08J 2323/06* (2013.01); *C08J 2323/12* (2013.01); *C08J 2323/16* (2013.01); *C08J 2333/08* (2013.01); *C08J 2367/00* (2013.01)

(56) References Cited

U.S. PATENT DOCUMENTS

| | | | |
|---|---|---|---|
| 9,150,716 B2 | 10/2015 | Saitou et al. | |
| 9,518,181 B2 | 12/2016 | Scholl et al. | |
| 10,316,156 B2 | 6/2019 | Doi et al. | |
| 2001/0039299 A1* | 11/2001 | Park | B29C 44/468 521/142 |
| 2012/0135221 A1* | 5/2012 | Weidinger | C08L 9/06 428/304.4 |
| 2013/0210949 A1 | 8/2013 | Scholl et al. | |
| 2013/0251979 A1 | 9/2013 | Saitou et al. | |
| 2014/0155507 A1 | 6/2014 | Kanada et al. | |
| 2014/0170406 A1 | 6/2014 | Yasuda et al. | |
| 2014/0242371 A1 | 8/2014 | Hatanaka et al. | |
| 2015/0099112 A1 | 4/2015 | Saitou et al. | |
| 2015/0225565 A1 | 8/2015 | Scholl et al. | |
| 2016/0303822 A1 | 10/2016 | Kato et al. | |
| 2016/0304680 A1 | 10/2016 | Doi et al. | |
| 2018/0265743 A1 | 9/2018 | Nagai et al. | |

FOREIGN PATENT DOCUMENTS

| | | | | |
|---|---|---|---|---|
| JP | 2014-005445 A | | 1/2014 | |
| JP | 2014005445 A | * | 1/2014 | ............... C09J 7/26 |
| JP | 2017-066404 A | | 4/2017 | |
| JP | 6178937 B1 | | 8/2017 | |
| KR | 10-2014-0124765 | | 10/2014 | |
| TW | 201406837 A | | 2/2014 | |
| WO | 2012/081396 A1 | | 6/2012 | |
| WO | 2013/018582 A1 | | 2/2013 | |
| WO | 2013/179946 A1 | | 12/2013 | |
| WO | 2014/098255 A1 | | 6/2014 | |
| WO | 2016/047612 A1 | | 3/2016 | |
| WO | 2017/057628 A1 | | 4/2017 | |

OTHER PUBLICATIONS

The Explanation of Circumstances Concerning Accelerated Examination dated Nov. 27, 2018, filed in corresponding Japanese patent application No. 2018-143561 with English translation thereof.
International Search Report for PCT/JP2018/029569 dated Nov. 6, 2018 [PCT/ISA/210].
Written Opinion for PCT/JP2018/029569 dated Nov. 6, 2018 [PCT/ISA/237].
First Office Action dated Mar. 9, 2022 from the China National Intellectual Property Administration in CN Machine Application No. 201880056510.7.
Request for Submission of an Opinion dated Jul. 27, 2022, issued by the Korean Intellectual Property Office in corresponding KR Appln 1020207005424.

* cited by examiner

RESIN SHEET AND ADHESIVE-LAYER-HAVING RESIN SHEET

CROSS REFERENCE TO RELATED APPLICATIONS

This application is a National Stage of International Application No. PCT/JP2018/029569 filed Aug. 7, 2018, claiming priority based on Japanese Patent Application No. 2017-163083 filed Aug. 28, 2017 and Japanese Patent Application No. 2018-143561 filed Jul. 31, 2018.

TECHNICAL FIELD

The present invention relates to a resin sheet and a resin sheet with a pressure-sensitive adhesive layer.

BACKGROUND ART

In an electronic device, such as a thin television, a personal computer, a mobile phone, or a portable game machine, the quantity of heat generated from a heat-generating part, such as an electronic part, has been increasing along with an increase in output of a LED that is a light-emitting source or higher integration of a CPU or the like, and the removal of the heat has been required.

To achieve this end, for example, the following method has been adopted. A thermal conductor is arranged in a space between the heat-generating part and a casing to integrate the heat-generating part and the casing with each other. Heat generated from the heat-generating part is conducted into the casing with the thermal conductor, and the heat is conducted from the casing to the outside, thereby cooling the heat-generating part.

An inorganic material sheet having high thermal conductivity, such as a graphite sheet, has been frequently utilized as the thermal conductor (Patent Literature 1).

However, when the inorganic material sheet having high thermal conductivity, such as a graphite sheet, is used, the temperature of part of the casing often becomes extremely high. In actuality, when a person touches the casing with a hand, the temperature often reaches the level at which the person feels uncomfortable. For example, the temperature makes the person feel the risk of a burn. In particular, such high temperature inhibits the operation of electronic devices each having portability (e.g., a mobile phone).

In general, the heat-generating part and the casing each have an uneven portion. In that case, the space between the heat-generating part and the casing has a complicated shape resulting from their uneven portions. For example, the space has a large portion and a small portion. In this case, when the thermal conductor is arranged in accordance with the small portion of the space, a gap occurs in the thick portion of the space to make it difficult to cause heat conduction in the portion. In contrast, when the thermal conductor is arranged in accordance with the large portion of the space, the casing and the heat-generating part cannot be integrated and fixed to each other in the thin portion of the space. In that case, a large force is required for storing the inorganic material sheet having high thermal conductivity, such as a graphite sheet, in the thin portion of the space. When the large force is applied, the casing that often includes a plastic or the like cannot resist a stress caused by the force, and hence may break or crack.

Because of such reasons as described above, when the inorganic material sheet having high thermal conductivity, such as a graphite sheet, is utilized as the thermal conductor as in the past, the heat-generating part, the thermal conductor, and the casing are not in contact with each other in an integrated manner, but the heat-generating part, the thermal conductor, and the casing are in partial contact with each other, and heat removal is performed only in the contact portion. The foregoing may cause a situation in which the temperature of part of the casing becomes extremely high. In addition, when the heat-generating part, the thermal conductor, and the casing are in contact with each other only in a partial manner, a high heat-conducting characteristic of the thermal conductor cannot be sufficiently exhibited.

Accordingly, such a thermal conductor that the heat-generating part, the thermal conductor, and the casing can be integrated with each other without hardship is required.

Such thermal conductor is, for example, a liquid material having high fluidity (material substantially free from showing elasticity), such as an epoxy resin before curing. However, the liquid material protrudes, or flows with time, owing to a force for integrating the heat-generating part, the thermal conductor, and the casing with each other, and hence its space-filling performance reduces with a lapse of time. To suppress a reduction in fluidity with time, a liquid material of a curable resin can be hardened by heating. However, a heating step is required, and it becomes difficult to remove the casing after the hardening.

When a resin showing rubber elasticity at room temperature is adopted as the thermal conductor, such problems of the liquid material as described above can be solved. However, when the resin showing rubber elasticity at room temperature receives a force from its thickness direction, longitudinal and lateral lengths in its plane direction are distorted by its compression. Accordingly, in the case where there is a portion where the length of the space between the heat-generating part and the casing is significantly small as compared to the thickness of the thermal conductor (e.g., in the case where the length is about ½ of the thickness), when an attempt is made to integrate the heat-generating part, the thermal conductor, and the casing with each other, longitudinal and lateral lengths in the plane direction of the thermal conductor are distorted by the compression of the thermal conductor in its thickness direction in the portion, and hence such an inconvenience as described below occurs. The thermal conductor that has extended in the longitudinal or lateral direction of the plane direction interferes with any other part or the like. In addition, even when the degree of such interference is low, a portion that has extended in the plane direction of the thermal conductor is reduced in heat-conducting performance.

In addition, in the case where at least part of the thermal conductor is compressed at the time of an attempt to integrate the heat-generating part, the thermal conductor, and the casing with each other, when the casing is removed after the lapse of some time from the integration, the thickness of the compressed portion often fails to sufficiently recover. Accordingly, when the casing is removed once after the integration, the following need arises. The old thermal conductor is removed and a new thermal conductor is used.

CITATION LIST

Patent Literature

[PTL 1] JP 61-275116 A

SUMMARY OF INVENTION

Technical Problem

An object of the present invention is to provide a resin sheet having the following features: the sheet can be easily compressed in its thickness direction; even when the sheet is compressed in the thickness direction, the distortion of each of longitudinal and lateral lengths in its plane direction is small; and when a force applied for the compression in the thickness direction is released after the compression, the thickness of the sheet sufficiently recovers. Another object of the present invention is to provide a resin sheet with a pressure-sensitive adhesive layer including such resin sheet.

Solution to Problem

According to one embodiment of the present invention, there is provided a resin sheet, including a main surface A and a main surface B opposite to each other across a thickness "d", wherein the resin sheet has a 50% compression load of 20 N/cm$^2$ or less at 23±5° C. in a direction of the thickness "d", which is measured in conformity with a method of measuring a compression hardness described in JIS K 6767:1999;

wherein the resin sheet has a Poisson's ratio at 23° C. of 0.10 or less; and wherein the resin sheet has a thickness recovery ratio of 40% or more when compressed by 20% in the direction of the thickness "d" at 23° C.

In one embodiment, the resin sheet includes a resin foam.

In one embodiment, the resin foam contains at least one selected from polyethylene, polypropylene, polyester, an EPDM, and an acrylic resin.

In one embodiment, the resin foam is formed by a foaming method that includes at least one selected from a chemical foaming method and a physical foaming method.

In one embodiment, when the resin sheet according to the one embodiment of the present invention includes the resin foam, the resin sheet has a cell wall ratio of from 5% to 80%.

In one embodiment, when the resin sheet according to the one embodiment of the present invention includes the resin foam, the resin sheet has an average cell diameter of from 40 μm to 500 μm.

In one embodiment, when the resin sheet according to the one embodiment of the present invention includes the resin foam, the resin sheet has an apparent density of from 0.01 g/cm$^3$ to 0.5 g/cm$^3$.

In one embodiment, when the resin sheet according to the one embodiment of the present invention includes the resin foam, the resin sheet has a thermal conductivity of from 0.05 W/m·K to 0.35 W/m·K.

According to one embodiment of the present invention, there is provided a resin sheet with a pressure-sensitive adhesive layer, including: the resin sheet; and a pressure-sensitive adhesive layer.

Advantageous Effects of Invention

According to the present invention, the resin sheet having the following features can be provided: the sheet can be easily compressed in its thickness direction; even when the sheet is compressed in the thickness direction, the distortion of each of longitudinal and lateral lengths in its plane direction is small; and when a force applied for the compression in the thickness direction is released after the compression, the thickness of the sheet sufficiently recovers. The resin sheet with a pressure-sensitive adhesive layer including such resin sheet can also be provided.

DESCRIPTION OF EMBODIMENTS

<<<<Resin Sheet>>>>

Figure 1:
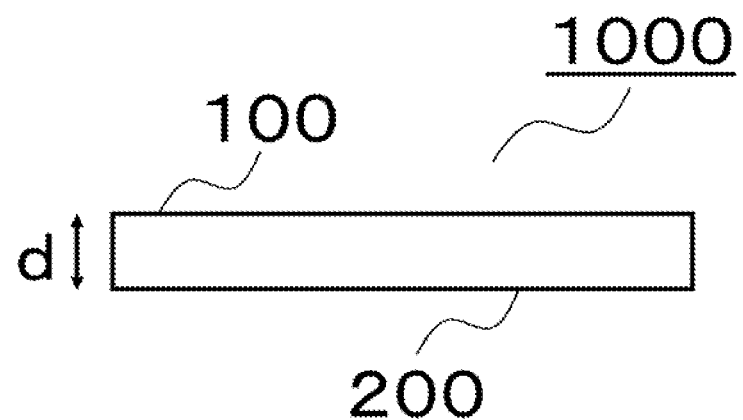
FIG. 1 is a schematic sectional view of a resin sheet according to one embodiment of the present invention.

A resin sheet according to one embodiment of the present invention is a resin sheet including a main surface A and a main surface B opposite to each other across a thickness "d". Specifically, as illustrated in FIG. 1, a resin sheet 1000 of the present invention includes a main surface A 100 and a main surface B 200 opposite to each other across the thickness "d".

The thickness "d" of the resin sheet is preferably from 50 μm to 500 μm, more preferably from 60 μm to 400 μm, still more preferably from 80 μm to 350 μm, particularly preferably from 100 μm to 300 μm, most preferably from 150 μm to 250 μm.

The 50% compression load of the resin sheet at 23±5° C. in the direction of the thickness "d", which is measured in conformity with a method of measuring a compression hardness described in JIS K 6767:1999, is 20 N/cm$^2$ or less, preferably 17 N/cm$^2$ or less, more preferably 15 N/cm$^2$ or less, still more preferably 10 N/cm$^2$ or less, particularly preferably 5 N/cm$^2$ or less, most preferably 3 N/cm$^2$ or less. The 50% compression load is an indicator of the ease of compression in the direction of the thickness "d", and as the load becomes smaller, the sheet can be more easily compressed in the thickness direction. In reality, the lower limit of the 50% compression load is 0.1 N/cm$^2$ or more. In the case where the 50% compression load falls within the range, the resin sheet can be easily compressed in the thickness direction.

Details about a method of measuring the 50% compression load at 23±5° C. in the direction of the thickness "d", which is measured in conformity with the method of measuring a compression hardness described in JIS K 6767: 1999, are described later.

The Poisson's ratio of the resin sheet at 23° C. is 0.10 or less, preferably 0.07 or less, more preferably 0.05 or less, still more preferably 0.03 or less, particularly preferably 0.02 or less, most preferably 0.01 or less. The Poisson's ratio is an indicator of the degree of distortion of each of longitudinal and lateral lengths in the plane direction of the sheet when a force from the thickness direction is applied to compress the sheet, and as the ratio becomes smaller, the distortion of each of the longitudinal and lateral lengths in the plane direction when the force from the thickness direction is applied to compress the sheet becomes smaller. In reality, the lower limit of the Poisson's ratio is 0.00. In the case where the Poisson's ratio falls within the range, the distortion of each of the longitudinal and lateral lengths in the plane direction can be small even when the resin sheet is compressed in the thickness direction.

Details about a method of measuring the Poisson's ratio at 23° C. are described later.

The resin sheet has a thickness recovery ratio of preferably 40% or more, more preferably 50% or more, still more preferably 60% or more, particularly preferably 70% or more, most preferably 80% or more when compressed by 20% in the direction of the thickness "d" at 23° C. The thickness recovery ratio is an indicator of the degree of recovery of the thickness when a force applied for the compression in the thickness direction is released after the compression, and as the ratio becomes larger, the thickness more sufficiently recovers. In reality, the upper limit of the thickness recovery ratio is 100%. In the case where the thickness recovery ratio falls within the range, the thickness can sufficiently recover when the force applied for the compression of the resin sheet in the thickness direction is released after the compression.

In the resin sheet, the arithmetic average surface roughness Ra of at least one of the main surface A or the main surface B is preferably 20 µm or less, more preferably 15 µm or less, still more preferably 10 µm or less, particularly preferably 5 µm or less, most preferably 3 µm or less. In the case where the arithmetic average surface roughness Ra of at least one of the main surface A or the main surface B falls within the range, for example, when an attempt is made to arrange a thermal conductor between a heat-generating part and a casing to integrate the heat-generating part and the casing with each other, heat can be efficiently conducted in a surface of contact between the heat-generating part and/or the casing, and the resin sheet. Any appropriate method may be adopted as a method of setting the arithmetic average surface roughness Ra of at least one of the main surface A or the main surface B within the range to the extent that the effects of the present invention are not impaired. Such method may be, for example, a method involving sandwiching the resin sheet between heated rollers to dissolve and tan its surface. According to such method, influences on the characteristics of the resin sheet can be reduced, and its surface unevenness can be simply reduced.

When another sheet whose arithmetic average surface roughness Ra has been adjusted within the above-mentioned range is laminated on at least one of the main surface A or main surface B of the resin sheet, the arithmetic average surface roughness Ra of at least one surface of the outermost layer can be adjusted within the above-mentioned range.

The resin sheet may include any appropriate other layer on at least one of the main surface A or the main surface B to the extent that the effects of the present invention are not impaired.

Any appropriate resin sheet may be adopted as the resin sheet to the extent that the effects of the present invention are not impaired. Such resin sheet preferably includes a resin foam.

When the resin sheet includes the resin foam, various physical properties that the resin sheet is required to have are appropriately adjusted with ease. When the resin sheet includes the resin foam, a gas (typically air) is present in a cell. Accordingly, the sheet is excellent in compressibility and expansibility, and is hence easily compressed in quick response to, for example, a compressive stress in its thickness direction. In addition, when the resin sheet includes the resin foam, the gas (typically air) in the cell easily moves to the inside and outside of the cell. Accordingly, even when the sheet is compressed in the thickness direction, the distortion of each of the longitudinal and lateral lengths in the plane direction can be small, and when a force applied for the compression in the thickness direction is released after the compression, the thickness can sufficiently recover. It is probably because of the following reason that the gas (typically air) in the cell easily moves to the inside and outside of the cell: gas molecules are extremely small as compared to molecules forming a resin present outside the cell, and hence easily pass through gaps between the molecules forming the resin.

Examples of the resin in the resin foam include: polyolefins, such as polyethylene and polypropylene; polyesters, such as polyethylene terephthalate; polycarbonate; rubber-based resins, such as an ethylene-propylene rubber (EPM) and an ethylene-propylene-diene rubber (EPDM); styrene-based resins; polyamide; polyimide; polyamide imide; polyether imide; polyurethane; acrylic resins; polyvinyl chloride; fluorine-containing resins, such as vinylidene fluoride; alkenyl aromatic resins; polyacetal; and polyphenylene sulfide. Preferred examples of such resin include: polyolefins, such as polyethylene and polypropylene; polyesters, such as polyethylene terephthalate; polycarbonate; rubber-based resins, such as ethylene-propylene rubber (EPM) and ethylene-propylene-diene rubber (EPDM); and acrylic resins, from the viewpoint that the effects of the present invention can be further expressed. Of those, at least one selected from polyethylene, polypropylene, polyesters, an EPDM, and acrylic resins is more preferred. The number of kinds of the resins in the resin foam may be only one, or may be two or more.

The content ratio of the resin in the resin foam is, for example, preferably from 5 wt % to 100 wt %, more preferably from 10 wt % to 99 wt %, still more preferably from 20 wt % to 98 wt %, particularly preferably from 30 wt % to 97 wt %, most preferably from 40 wt % to 96 wt %.

The polyethylene is, for example, any appropriate polyethylene, such as low-density polyethylene, linear low-density polyethylene, medium-density polyethylene, or high-density polyethylene, to the extent that the effects of the present invention are not impaired. Of those polyethylenes, linear low-density polyethylene is preferred because the effects of the present invention can be further expressed. The polyethylene may be only one kind of polyethylene, or may be two or more kinds of polyethylenes.

The polypropylene is, for example, any appropriate polypropylene, such as homopolypropylene, block polypropylene, or random polypropylene, to the extent that the effects of the present invention are not impaired. The melt flow rate (MFR) of the polypropylene is preferably from 0.1 g/10 min to 5.0 g/10 min, more preferably from 0.15 g/10 min to 4.0 g/10 min, still more preferably from 0.2 g/10 min to 3.0 g/10 min, particularly preferably from 0.25 g/10 min to 2.0 g/10 min, most preferably from 0.3 g/10 min to 1.0 g/10 min because the effects of the present invention can be further expressed. The polypropylene may be only one kind of polypropylene, or may be two or more kinds of polypropylenes.

The acrylic resin is preferably an acrylic polymer formed by using a monomer whose homopolymer has a Tg of $-10°$ C. or more and a monomer whose homopolymer has a Tg of less than $-10°$ C. as essential monomer components.

The term "Tg of the homopolymer" refers to a "glass transition temperature (Tg) at the time of the formation of the homopolymer," and means the "glass transition temperature (Tg) of the homopolymer of the monomer." Specifically, a numerical value is listed in "Polymer Handbook" (3rd edition, John Wiley & Sons, Inc., 1987). The Tg of a homopolymer of a monomer that is not described in the literature refers to, for example, a value obtained by the following measurement method (see JP 2007-51271 A). That is, 100 parts by weight of the monomer, 0.2 part by weight of 2,2'-azobisisobutyronitrile, and 200 parts by weight of ethyl acetate serving as a polymerization solvent are loaded into a reactor including a temperature gauge, a stirring machine, a nitrogen-introducing tube, and a reflux condenser, and are stirred for 1 hour while a nitrogen gas is introduced into the reactor. After oxygen in a polymerization system has been removed as described above, a temperature in the reactor is increased to 63° C. and the mixture is subjected to a reaction for 10 hours. Next, the resultant is cooled to room temperature to provide a homopolymer solution having a solid content concentration of 33 wt %. Next, the homopolymer solution is cast and applied onto a separator, and is dried to produce a test sample having a thickness of about 2 mm (sheet-shaped homopolymer). Then, the test sample is punched into a disc shape having a diameter of 7.9 mm. The disc is sandwiched between parallel plates, and its viscoelasticity is measured with a viscoelasticity tester (ARES, manufactured by Rheometric Scientific, Inc.) in the temperature region of from −70° C. to 150° C. at a rate of temperature increase of 5° C./min by a shear mode while a shear strain having a frequency of 1 Hz is applied to the disc. The peak top temperature of the tan δ of the disc is defined as the Tg of the homopolymer.

In the monomer whose homopolymer has a Tg of −10° C. or more, the Tg is, for example, preferably from −10° C. to 250° C., more preferably from 10° C. to 230° C., still more preferably from 50° C. to 200° C.

Examples of the monomer whose homopolymer has a Tg of −10° C. or more include: (meth)acrylonitrile; an amide group-containing monomer, such as (meth)acrylamide or N-hydroxyethyl (meth)acrylamide; (meth)acrylic acid; a (meth)acrylic acid alkyl ester whose homopolymer has a Tg of −10° C. or more, such as methyl methacrylate or ethyl methacrylate; isobornyl (meth)acrylate; a heterocycle-containing vinyl monomer, such as N-vinyl-2-pyrrolidone; and a hydroxyl group-containing monomer, such as 2-hydroxyethyl methacrylate. The number of kinds of those monomers may be only one, or may be two or more. Of those, (meth)acrylonitrile (especially acrylonitrile) is particularly preferred.

In the monomer whose homopolymer has a Tg of less than −10° C., the Tg is, for example, preferably −70° C. or more and less than −10° C., more preferably from −70° C. to −12° C., still more preferably from −65° C. to −15° C.

The monomer whose homopolymer has a Tg of less than −10° C. is, for example, a (meth)acrylic acid alkyl ester whose homopolymer has a Tg of less than −10° C., such as ethyl acrylate, butyl acrylate, or 2-ethylhexyl acrylate. The number of kinds of those monomers may be only one, or may be two or more. Of those, an acrylic acid C2-8 alkyl ester is particularly preferred. Herein, the term "C2-8" means that the number of carbon atoms is from 2 to 8. When the term "Ca-b" appears in the following description, the term similarly means that the number of carbon atoms is from a to b.

The content of the monomer whose homopolymer has a Tg of −10° C. or more with respect to all monomer components forming the acrylic polymer (monomer component total amount) is preferably from 2 wt % to 30 wt %. The lower limit of the content is preferably 3 wt %, more preferably 4 wt %, and the upper limit thereof is preferably 25 wt %, more preferably 20 wt %. In addition, the content of the monomer whose homopolymer has a Tg of less than −10° C. with respect to all monomer components forming the acrylic polymer (monomer component total amount) is preferably from 70 wt % to 98 wt %. The lower limit of the content is preferably 75 wt %, more preferably 80 wt %, and the upper limit thereof is preferably 97 wt %, more preferably 96 wt %.

The monomer forming the acrylic polymer may contain a nitrogen atom-containing monomer. Examples of the nitrogen atom-containing monomer include: a cyano group-containing monomer, such as (meth)acrylonitrile; a lactam ring-containing monomer, such as N-vinyl-2-pyrrolidone; and an amide group-containing monomer, such as (meth)acrylamide, N-hydroxyethyl (meth)acrylamide, N-methylol acrylamide, N,N-dimethyl acrylamide, N,N-diethyl acrylamide, or diacetone acrylamide. Of those, a cyano group-containing monomer, such as acrylonitrile, and a lactam ring-containing monomer, such as N-vinyl-2-pyrrolidone, are preferred. The number of kinds of the nitrogen atom-containing monomers may be only one, or may be two or more.

In the acrylic polymer having a structural unit derived from the nitrogen atom-containing monomer, the content of the structural unit derived from the nitrogen atom-containing monomer is preferably from 2 wt % to 30 wt % with respect to all structural units forming the acrylic polymer. The lower limit of the content is preferably 3 wt %, more preferably 4 wt %, and the upper limit thereof is preferably 25 wt %, more preferably 20 wt %.

The acrylic polymer having the structural unit derived from the nitrogen atom-containing monomer preferably contains a structural unit derived from an acrylic acid C2-18 alkyl ester (especially an acrylic acid C2-8 alkyl ester) in addition to the structural unit derived from the nitrogen atom-containing monomer. The number of kinds of the acrylic acid C2-18 alkyl esters may be only one, or may be two or more. In such acrylic polymer, the content of the structural unit derived from the acrylic acid C2-18 alkyl ester (especially the acrylic acid C2-8 alkyl ester) is preferably from 70 wt % to 98 wt % with respect to all the structural units forming the acrylic polymer. The lower limit of the content is preferably 75 wt %, more preferably 80 wt %, and the upper limit thereof is preferably 97 wt %, more preferably 96 wt %.

The resin foam may contain any appropriate additive to the extent that the effects of the present invention are not impaired. Examples of such additive include a softening agent, an age resistor, a weathering agent, a UV absorber, a dispersant, a plasticizer, a colorant (e.g., a pigment or a dye), an antistatic agent, a surfactant, a tension modifier, a fluidity modifier, a lubricant, an antioxidant, a filler, a reinforcing agent, a surface treatment agent, a shrinkage-preventing agent, a vulcanizing agent, a flame retardant, a cross-linking agent, and a thickening agent. The number of kinds of those additives may be only one, or may be two or more.

Examples of the softening agent include: mineral oils, such as a paraffin-based mineral oil, a naphthene-based mineral oil, and an aromatic mineral oil; petroleum-based substances, such as process oil, lubricating oil, liquid paraffin, petroleum asphalt, and Vaseline; coal tars, such as coal tar and coal-tar pitch; fatty oils, such as castor oil, linseed oil, rapeseed oil, soybean oil, and palm oil; waxes, such as tall oil, beeswax, carnauba wax, and lanolin; synthetic polymer substances, such as a petroleum resin, a coumarone indene resin, and atactic polypropylene; ester compounds, such as dioctyl phthalate, dioctyl adipate, and dioctyl sebacate; microcrystalline wax; factice; liquid polybutadiene; modified liquid polybutadiene; liquid thiokol; liquid polyisoprene; liquid polybutene; and a liquid ethylene-α-olefin-based copolymer. The number of kinds of the softening agents may be only one, or may be two or more.

When the resin foam contains the softening agent, the content ratio of the softening agent in the resin foam is, for example, preferably from 1 wt % to 200 wt %, more preferably from 3 wt % to 150 wt %, still more preferably from 5 wt % to 100 wt %, particularly preferably from 7 wt % to 70 wt %, most preferably from 10 wt % to 50 wt %. When the content ratio of the softening agent in the resin foam falls within the range, the processability and flexibility of the resin sheet can be further improved.

The flame retardant can improve the flame retardancy of the resin foam. Accordingly, the resin foam containing the flame retardant may find use in applications where flame retardancy is required, such as electrical or electronic device applications. The flame retardant may be powdery, or may be of a shape except a powder shape. An inorganic flame retardant is preferred as a powdery flame retardant. Examples of the inorganic flame retardant include a bromine-based flame retardant, a chlorine-based flame retardant, a phosphorus-based flame retardant, an antimony-based flame retardant, and a non-halogen-non-antimony-based inorganic flame retardant. Herein, each of the chlorine-based flame retardant and the bromine-based flame retardant produces a gas component that is harmful to a human body and has corrosive properties against devices at the time of its combustion. In addition, each of the phosphorus-based flame retardant and the antimony-based flame retardant involves problems such as harmfulness and explosibility. Accordingly, the inorganic flame retardant is preferably the non-halogen-non-antimony-based inorganic flame retardant. The non-halogen-non-antimony-based inorganic flame retardant is, for example, a hydrated metal compound, such as: aluminum hydroxide; magnesium hydroxide; a hydrate of magnesium oxide and nickel oxide; or a hydrate of magnesium oxide and zinc oxide. The hydrated metal oxide may be subjected to a surface treatment.

The flame retardant preferably has a function as a cell nucleating agent as well because a resin foam having flame retardancy and a high foaming ratio is obtained. The flame retardant having a function as a cell nucleating agent is, for example, magnesium hydroxide or aluminum hydroxide.

The number of kinds of the flame retardants may be only one, or may be two or more.

When the resin foam contains the flame retardant, the content ratio of the flame retardant in the resin foam is, for example, preferably from 1 wt % to 150 wt %, more preferably from 2 wt % to 130 wt %, still more preferably from 3 wt % to 100 wt %, particularly preferably from 4 wt % to 70 wt %, most preferably from 5 wt % to 50 wt %.

The lubricant can improve the fluidity of a resin composition forming the resin foam and suppress the thermal deterioration thereof. Examples of the lubricant include: hydrocarbon-based lubricants, such as liquid paraffin, a paraffin wax, a microwax, and a polyethylene wax; fatty acid-based lubricants, such as stearic acid, behenic acid, and 12-hydroxystearic acid; and ester-based lubricants, such as butyl stearate, stearic acid monoglyceride, pentaerythritol tetrastearate, hydrogenated castor oil, and stearyl stearate. The number of kinds of the lubricants may be only one, or may be two or more.

When the resin foam contains the lubricant, the content ratio of the lubricant in the resin foam is, for example, preferably from 0.1 wt % to 20 wt %, more preferably from 0.2 wt % to 15 wt %, still more preferably from 0.3 wt % to 10 wt %, particularly preferably from 0.4 wt % to 7 wt %, most preferably from 0.5 wt % to 5 wt %.

Examples of the cross-linking agent include epoxy-based, oxazoline-based, isocyanate-based, carbodiimide-based, melamine-based, and metal oxide-based cross-linking agents. Of those, an oxazoline-based cross-linking agent is preferred.

The addition amount (solid content (nonvolatile content)) of the cross-linking agent is, for example, preferably from 0 parts by weight to 30 parts by weight with respect to 100 parts by weight of a resin material (polymer) (solid content (nonvolatile content)). The lower limit of the amount is preferably 0.01 part by weight, more preferably 0.5 part by weight, still more preferably 1 part by weight, particularly preferably 2 parts by weight, and the upper limit thereof is preferably 25 parts by weight, more preferably 20 parts by weight.

Examples of the thickening agent include an acrylic acid-based thickening agent, a urethane-based thickening agent, and a polyvinyl alcohol-based thickening agent. Of those, a polyacrylic acid-based thickening agent and a urethane-based thickening agent are preferred.

The addition amount (solid content (nonvolatile content)) of the thickening agent is, for example, preferably from 0 parts by weight to 10 parts by weight with respect to 100 parts by weight of a resin material (polymer) (solid content (nonvolatile content)). The lower limit of the amount is preferably 0.1 part by weight, and the upper limit thereof is preferably 5 parts by weight.

When the resin sheet includes the resin foam, the cell wall ratio of the resin foam is preferably from 5% to 80%, more preferably from 10% to 75%, still more preferably from 20% to 70%, particularly preferably from 30% to 65%, most preferably from 30% to 60%. When the cell wall ratio of the resin foam falls within the range, the effects of the present invention can be further expressed. In addition, the sheet can have appropriate heat exchangeability, and can be improved in shock absorbability. Herein, the foam typically has a heat-insulating effect. Accordingly, when the foam is integrated with a heat-generating part, the cooling ability of the heat-generating part reduces. However, when the cell wall ratio of the resin foam falls within the range, heat passes through a cell wall formed from the resin to be appropriately conducted, and hence the sheet can have appropriate heat exchangeability.

When the resin sheet includes the resin foam, the average cell diameter of the resin foam is preferably from 40 μm to 500 μm, more preferably from 50 μm to 400 μm, still more preferably from 60 μm to 300 μm, particularly preferably from 70 μm to 200 μm, most preferably from 80 μm to 150 μm.

The size of the average cell diameter of the resin foam affects, for example, an ability to transfer heat discharged from a heat-generating part and the dynamic properties of a cell. Specifically, for example, heat discharged to a casing through a cell wall is preferably discharged so as to uniformly warm the casing. Accordingly, the resin foam preferably includes many cell walls. At this time, when a resin foam whose average cell diameter falls within the above-mentioned range is used, a cell wall having a thickness suitable for uniform warming of the casing is easily obtained. When the average cell diameter is excessively large, there is a risk in that each cell wall becomes larger, and hence the casing is liable to be partially heated. In addition, when the average cell diameter is excessively large, the ratio of the cell volume of an individual cell to the area of the cell in contact with a cell wall may also become larger to adversely affect the deformability of the resin foam by the permeation of the gas in the cell. When the average cell diameter is excessively small, a cell wall thickness reduces, and hence a resin foam including cell walls that are more closely meshed (dendritic) may be obtained. Such resin foam is easily deformed by an external stress, and hence may be reduced in cushioning property.

Many cells are preferably present in the resin foam. Specifically, when the gas in each of the cells is air, the apparent density of the resin foam is preferably from 0.01 g/cm$^3$ to 0.5 g/cm$^3$, more preferably from 0.02 g/cm$^3$ to 0.3 g/cm$^3$, still more preferably from 0.03 g/cm$^3$ to 0.2 g/cm$^3$, particularly preferably from 0.04 g/cm$^3$ to 0.15 g/cm$^3$, most preferably from 0.05 g/cm$^3$ to 0.12 g/cm$^3$.

The thermal conductivity of the resin foam is preferably from 0.05 W/m·K to 0.35 W/m·K, more preferably from 0.08 W/m·K to 0.33 W/m·K, still more preferably from 0.10 W/m·K to 0.30 W/m·K, particularly preferably from 0.13 W/m·K to 0.27 W/m·K, most preferably from 0.15 W/m·K to 0.25 W/m·K.

The cell structure of the resin foam is, for example, preferably a closed-cell structure or a semi-open and semi-closed-cell structure (cell structure in which a closed-cell structure and an open-cell structure are mixed), more preferably a semi-open and semi-closed-cell structure. The ratio of the closed-cell structure portion of the resin foam is preferably 40% or less, more preferably 30% or less with respect to the volume (100%) of the resin foam in terms of the flexibility of the foam. The cell structure may be controlled by, for example, regulating a foaming ratio by the amount of a foaming agent to be impregnated into the resin composition and a pressure at the time of the foam forming of the composition.

The resin foam is formed by foaming the resin composition. The resin composition is a material for forming the resin foam. That is, the resin foam is formed from the resin composition.

The resin composition may further contain a cell nucleating agent (foam nucleating agent) or a crystal nucleating agent. The resin composition preferably contains the cell nucleating agent out of those agents. When the resin composition contains the cell nucleating agent, a resin foam having a uniform and fine cell structure is easily obtained by foaming the composition.

Examples of the cell nucleating agent include particles. Examples of such particles include talc, silica, alumina, zeolite, calcium carbonate, magnesium carbonate, barium sulfate, zinc oxide, titanium oxide, aluminum hydroxide, magnesium hydroxide, mica, montmorillonite, and other clays, carbon particles, glass fiber, and a carbon tube (e.g., a carbon nanotube). The number of kinds of the cell nucleating agents may be only one, or may be two or more.

The average particle diameter (particle diameter) of the particles serving as the cell nucleating agent is, for example, preferably from 0.1 μm to 20 μm. When the average particle diameter (particle diameter) of the particles serving as the cell nucleating agent falls within the range, the particles can more sufficiently exhibit a function as the cell nucleating agent, and the gas can more hardly escape from the cells at the time of the foam forming.

When the resin composition contains the cell nucleating agent, the content ratio of the cell nucleating agent in the resin composition is, for example, preferably from 0.5 wt % to 125 wt %, more preferably from 1 wt % to 120 wt %.

The resin composition may be produced by kneading materials such as the above-mentioned resin. For example, the resin composition may be obtained by kneading and extruding the materials with any appropriate melt-kneading extrusion apparatus, such as a uniaxial (monoaxial) kneading extruder or a biaxial kneading extruder. The resin composition is of, for example, a strand shape, a sheet shape, a flat plate shape, or a pellet shape (e.g., a pellet shape obtained by cooling the resin composition extruded into a strand shape with water or air, and cutting the cooled composition into an appropriate length).

When the resin is an acrylic resin, an emulsion containing a resin material (emulsion resin composition) is preferably used as the resin composition from the viewpoint of foamability. A blend of two or more kinds of emulsions may be used as the emulsion. The solid content concentration of the emulsion is preferably as high as possible from the viewpoint of the film formability of the composition. The solid content concentration of the emulsion is preferably 30 wt % or more, more preferably 40 wt % or more, still more preferably 50 wt % or more.

A method of foaming the resin composition is, for example, a physical foaming method or a chemical foaming method. The physical foaming method is a method involving impregnating (dispersing) a low-boiling point liquid (foaming agent) into the resin composition, and then volatilizing the foaming agent to forma cell. The chemical foaming method is a method involving forming a cell with a gas produced by the pyrolysis of a compound added to the resin composition. Of those, the physical foaming method is preferred in terms of the avoidance of the contamination of a resin foamed sheet, and the ease with which a fine and uniform cell structure is obtained, and a physical foaming method involving using a high-pressure gas as the foaming agent is more preferred.

The foaming agent to be used in the physical foaming method is, for example, preferably a gas in terms of the ease with which a cell structure that is fine and has a high cell density is obtained, more preferably a gas inert to the resin in the resin composition (inert gas). Examples of the inert gas include carbon dioxide, a nitrogen gas, air, helium, and argon. Of those inert gases, carbon dioxide is preferred because carbon dioxide is impregnated in a large amount and at a high rate into the resin composition. The number of kinds of the inert gases may be only one, or may be two or more.

The content ratio of the foaming agent in the resin composition is preferably from 2 wt % to 10 wt %.

In order to increase the impregnation rate of the inert gas into the resin composition, the gas is preferably in a supercritical state at the time of the impregnation. That is, the resin foam is preferably formed by foaming the resin composition with a supercritical fluid. When the inert gas is a supercritical fluid (in a supercritical state), the solubility of the inert gas into the resin composition increases, and hence the inert gas can be impregnated (mixed) at a high concentration into the composition. In addition, the inert gas can be impregnated at a high concentration, and hence when its pressure is abruptly reduced after the impregnation, the frequency of occurrence of a cell nucleus increases. Accordingly, a fine cell can be obtained. Carbon dioxide has a critical temperature of 31° C. and a critical pressure of 7.4 MPa.

The following method is preferred as a physical foaming method involving using a gas as the foaming agent: a high-pressure gas (e.g., an inert gas) is impregnated into the resin composition; and then the composition is foamed through a step of reducing the pressure of the gas (to, for example, atmospheric pressure) (step of releasing the pressure) to form the resin foam. Specific examples of such method include: a method involving forming the resin composition to provide an unfoamed formed product, impregnating the high-pressure gas into the unfoamed formed product, and then foaming the formed product through the step of reducing the pressure (to, for example, atmospheric pressure) to form the foam; and a method involving impregnating a gas (e.g., an inert gas) into the resin composition, which has been melted, under a pressurized state, then reducing the pressure of the gas (to, for example, atmospheric pressure) to foam the composition, and subjecting the resultant to forming to form the foam.

When the resin foam is formed, the formation may be performed by a system (batch system) involving forming the resin composition into an appropriate shape, such as a sheet shape, to provide an unfoamed resin formed body (unfoamed formed product), then impregnating the high-pressure gas into the unfoamed resin formed body, and releasing the pressure of the gas to foam the formed body. Alternatively, the formation may be performed by a system (continuous system) involving kneading the resin composition together with the high-pressure gas under a high-pressure condition, and forming the kneaded product, and at the same time, releasing the pressure to simultaneously perform the forming and foaming of the kneaded product.

A method of forming the unfoamed resin formed body in the batch system is, for example, any one of the following methods: a method involving forming the resin composition with an extruder such as a monoaxial extruder or a biaxial extruder; a method involving uniformly kneading the resin composition with a kneader including a blade of, for example, a roller-, cam-, kneader-, or Banbury-type, and subjecting the kneaded product to press forming into a predetermined thickness with, for example, a hot-plate press; and a method involving forming the resin composition with an injection molding machine. In addition, the shape of the unfoamed resin formed body is, for example, a sheet shape, a roll shape, or a plate shape. In the batch system, the resin composition is subjected to forming by an appropriate method by which an unfoamed resin formed body having a desired shape and a desired thickness is obtained.

In the batch system, the cell structure is formed through: a gas-impregnating step of loading the unfoamed resin formed body into a pressure-resistant vessel, followed by the injection (introduction or mixing) of the high-pressure gas to impregnate the gas into the unfoamed resin formed body; and a decompressing step of releasing the pressure of the gas (to typically atmospheric pressure) at the time point when the gas is sufficiently impregnated to produce a cell nucleus in the resin composition.

In the continuous system, the resin composition is subjected to foam forming by: a kneading and impregnating step of injecting (introducing or mixing) the high-pressure gas, while kneading the resin composition with an extruder (e.g., a monoaxial extruder or a biaxial extruder) or an injection molding machine, to sufficiently impregnate the high-pressure gas into the resin composition; and a forming and decompressing step of extruding the resin composition through a die or the like arranged at the tip of the extruder to release the pressure (to typically atmospheric pressure), thereby simultaneously performing the forming and foaming of the composition.

In the batch system or the continuous system, a heating step of growing a cell nucleus through heating may be provided as required. The cell nucleus may be grown at room temperature without the provision of the heating step. Further, after the cell nucleus has been grown, its shape may be fixed by abrupt cooling with, for example, cold water as required. The introduction of the high-pressure gas may be continuously performed, or may be discontinuously performed. A heating method at the time of the growth of the cell nucleus is, for example, a method involving using a water bath, an oil bath, a heat roll, a hot-air oven, a far-infrared ray, a near-infrared ray, or a microwave.

In the gas-impregnating step of the batch system or the kneading and impregnating step of the continuous system, the pressure when the gas is impregnated is appropriately selected in consideration of, for example, the kind of the gas and operability, and is, for example, preferably from 5 MPa to 100 MPa, more preferably from 7 MPa to 100 MPa. That is, a gas having a pressure of from 5 MPa to 100 MPa is preferably impregnated into the resin composition, and a gas having a pressure of from 7 MPa to 100 MPa is more preferably impregnated thereinto. When the pressure of the gas is 5 MPa or more, the following tendency is observed: cell growth at the time of the foaming of the composition is moderately suppressed, and hence a cell can be suppressed from becoming excessively large. This is because of the following reason. When the pressure is high, the amount of the gas to be impregnated becomes relatively large as compared to that at the time of a low pressure, and hence a cell nucleus formation rate is high and the number of cell nuclei to be formed increases. Accordingly, the amount of the gas per one cell is suppressed, and hence a cell diameter hardly becomes excessively large. In addition, in a pressure region of 5 MPa or more, even when the impregnation pressure is changed to a small extent, the cell diameter and a cell density hardly change to a large extent, and hence the cell diameter and the cell density tend to be easily controlled.

In the gas-impregnating step in the batch system or the kneading and impregnating step in the continuous system, a temperature when the gas is impregnated (impregnation temperature) varies depending on the kinds of the gas and the resin to be used, and may be selected from a wide range. In consideration of the operability or the like, however, the temperature is preferably from 10° C. to 350° C. The impregnation temperature in the batch system is preferably from 10° C. to 250° C., more preferably from 40° C. to 240° C., still more preferably from 60° C. to 230° C. The impregnation temperature in the continuous system is preferably from 60° C. to 350° C., more preferably from 100° C. to 320° C., still more preferably from 150° C. to 300° C. When carbon dioxide is used as the high-pressure gas, the temperature at the time of the impregnation (impregnation temperature) is preferably 32° C. or more, more preferably 40° C. or more for retaining the supercritical state of the gas. In addition, before the resin composition is subjected to foam forming after the gas has been impregnated, the resin composition having impregnated thereinto the gas may be cooled to a temperature suitable for the foam forming (e.g., from 150° C. to 190° C.).

In the batch system or the continuous system, a decompression rate in the decompressing step (step of releasing the pressure) is, for example, preferably from 5 MPa/sec to 300 MPa/sec for obtaining a cell structure having a uniform and fine cell.

When the heating step is arranged for growing a cell nucleus, a heating temperature is, for example, preferably from 40° C. to 250° C., more preferably from 60° C. to 250° C.

The cell structure, density, and relative density of the resin foam may be adjusted by selecting a foaming method and foaming conditions at the time of the foam forming of the resin composition (e.g., the kind and amount of the foaming agent, and a temperature, a pressure, and a time period at the time of the foaming) in accordance with the kind of the resin forming the foam.

When the resin is an acrylic resin, a method of producing the foam through a step of mechanically foaming the resin composition (preferably an emulsion resin composition) to produce a cell (step A) is preferred. That is, the resin foam is preferably a mechanical foam of the resin composition (e.g., an emulsion resin composition). A foaming apparatus is, for example, an apparatus of a high-speed shearing system, a vibration system, or a pressurized gas-ejecting system. Of those, the high-speed shearing system is preferred from the viewpoints of a reduction in cell diameter and large-volume production of the foam.

A cell when the composition is foamed by mechanical stirring is such that a gas is taken in an emulsion. Any appropriate gas may be adopted as the gas as long as the gas is inert to the emulsion. Examples of such gas include air, nitrogen, and carbon dioxide. Of those, air is preferred from the viewpoint of economic efficiency.

A sheet of the resin foam may be obtained through a step of applying the resin composition (preferably an emulsion resin composition) foamed by the above-mentioned method onto a base material, followed by drying (step B). Examples of the base material include a release-treated plastic film (e.g., a release-treated polyethylene terephthalate film) and a plastic film (e.g., a polyethylene terephthalate film).

Any appropriate methods may be adopted as an application method and a drying method in the step B. The step B preferably includes: a preliminary drying step B1 of drying the resin composition (preferably an emulsion resin composition) applied onto the base material at 50° C. or more and less than 125° C.; and a main drying step B2 of further drying the composition at 125° C. or more and 200° C. or less after the preliminary drying. The provision of the preliminary drying step B1 and the main drying step B2 can prevent the coalescence of cells and the rupture of the cells due to an abrupt temperature increase. Particularly in a sheet of the resin foam having a small thickness, the significance of the provision of the preliminary drying step B1 is large because the cells coalesce or rupture owing to an abrupt temperature increase. The temperature in the preliminary drying step B1 is preferably 50° C. or more and 100° C. or less. A time period for the preliminary drying step B1 is preferably from 0.5 minute to 30 minutes, more preferably from 1 minute to 15 minutes. The temperature in the main drying step B2 is preferably 130° C. or more and 180° C. or less, more preferably 130° C. or more and 160° C. or less. A time period for the main drying step B2 is preferably from 0.5 minute to 30 minutes, more preferably from 1 minute to 15 minutes.

When the resin is an acrylic resin, the average cell diameter, maximum cell diameter, and minimum cell diameter of the resin foam may be adjusted by adjusting the kind and amount of a surfactant, or adjusting a stirring speed and a stirring time at the time of the mechanical stirring.

When the resin is an acrylic resin, the apparent density of the resin foam may be adjusted by the amount of a gas component to be taken in the resin composition (preferably an emulsion resin composition) at the time of the mechanical stirring.

The resin foam may be subjected to slicing. Specifically, after the resin composition has been foamed to provide the resin foam, surfaces on both sides of the resin foam may be subjected to the slicing. The resin foam often has, near a surface thereof, a laminar portion having a density higher than that of the inside of the foam (a laminar portion having a foaming ratio lower than that of the inside, a skin layer). The slicing can remove the laminar portion, and hence can expose an internal cell structure to the surface of the resin foam to arrange an opening portion. In addition, the slicing can achieve an improvement in thickness accuracy of the foam. Thus, the thickness accuracy is improved.

A surface of the resin foam may be subjected to a heating and melting treatment. Specifically, the following may be performed: after the resin composition has been foamed to provide the resin foam, as required, the resin foam is subjected to slicing, and the surface of the resin foam is subjected to the heating and melting treatment. When the surface in the thickness direction of the foam is melted as described above, while a reduction in flexibility thereof is suppressed to the minimum, the tensile strength thereof in its lengthwise direction is improved to suppress the occurrence of, for example, the rupture and tearing thereof. Thus, the resin foam can be continuously obtained with ease. In addition, when the foamed portion of the foam returns to an unfoamed state (bulk), the surface roughness (thickness error) thereof reduces, and hence the thickness accuracy thereof is improved. In this description, a resin foam that is obtained by foaming the resin composition and has not been subjected to the heating and melting treatment yet is sometimes referred to as "foamed structural body".

It is preferred that the heating and melting treatment be entirely performed on at least one surface of the foamed structural body, for example, because the thickness accuracy is easily improved. That is, the resin foam is preferably obtained by foaming the resin composition to provide the foamed structural body, and then subjecting one surface, or each of both surfaces, of the foamed structural body to the heating and melting treatment. In addition, one and the same surface may be subjected to the heating and melting treatment twice or more.

Examples of the heating and melting treatment include: a press treatment with a heat roll; a laser irradiation treatment; a contact melting treatment on a heated roll; and a flame treatment. In the case of the press treatment with the heat roll, the treatment may be performed with, for example, a heat laminator. A material for the roll is, for example, a rubber, a metal, or a fluorine-based resin (e.g., Teflon (trademark)).

The lower limit value of a temperature at the time of the heating and melting treatment is preferably equal to or more than a temperature lower than the softening point or melting point of the resin in the resin foam by 15° C., more preferably equal to or more than a temperature lower than the softening point or melting point of the resin in the resin foam by 12° C., and the upper limit value thereof is preferably equal to or less than a temperature higher than the softening point or melting point of the resin in the resin foam by 20° C., more preferably equal to or less than a temperature higher than the softening point or melting point of the resin in the resin foam by 10° C.

When the resin in the resin foam is a polyolefin-based resin (e.g., polyethylene or polypropylene), the temperature at the time of the heating and melting treatment is specifically, for example, preferably from 100° C. to 300° C., more preferably from 150° C. to 250° C., still more preferably from 170° C. to 230° C.

A treatment time for the heating and melting treatment is, for example, preferably from 0.1 second to 10 seconds, more preferably from 0.5 second to 7 seconds. When the treatment time falls within the range, a sufficient time for the melting of the resin foam can be secured, the occurrence of a wrinkle or the like due to excessive heating can be suppressed, and the heating and melting treatment can be sufficiently performed. Thus, the thickness accuracy of the resin foam can be further improved.

The heating and melting treatment is preferably performed with a heating and melting treatment apparatus that can adjust a gap (a space or an interval) through which the foamed structural body passes. Such heating and melting treatment apparatus is, for example, a continuous treatment apparatus having a heating roll (thermodielectric roll) that can adjust the gap.

Any other layer may be laminated on the laminar resin foam. The other layer may be arranged only on one surface side of the resin foam, or may be arranged on each of both surface sides thereof. The other layer may be a single layer, or may be a laminate formed of a plurality of layers. Examples of the other layer include: a pressure-sensitive adhesive layer; an intermediate layer (e.g., an undercoat layer for improving adhesiveness); and a base material layer (e.g., a film layer or a nonwoven fabric layer).

A winding body is obtained by winding the laminar resin foam (when any other layer is laminated, a laminate with the other layer) into a roll shape. No other layer is preferably laminated on the resin foam in the winding body. The winding body is preferably formed of a core and the resin foam wound around the core. When a layer having a predetermined strength is laminated as any other layer on the resin foam, an appearance abnormality or bamboo shoot-shaped deformation relatively hardly occurs after the cutting processing of the winding body. In the winding body, however, even when no other layer is laminated (e.g., when the winding body is formed only of a core and the above-mentioned resin foam sheet wound around the core), an appearance abnormality or bamboo shoot-shaped deformation after the cutting hardly occurs. Therefore, there is no need to laminate the layer having a predetermined strength as the other layer on the resin foam, and hence labor and cost for the bonding of the other layer can be reduced.

The winding is preferably performed by winding the resin foam or the laminate around the core. A tension at the time of the winding is, for example, preferably from 1 N/200 mm to 20 N/200 mm, more preferably from 2 N/200 mm to 10 N/200 mm. When the tension falls within the range, a moderate tension is applied to the resin foam, and the resin foam hardly deforms at the time of the winding.

A speed at the time of the winding (take-up speed) is, for example, preferably from 1 m/min to 50 m/min, more preferably from 5 m/min to 30 m/min.

<<<<Resin Sheet with Pressure-sensitive Adhesive Layer>>>>

A resin sheet with a pressure-sensitive adhesive layer according to one embodiment of the present invention includes the resin sheet according to the one embodiment of the present invention and a pressure-sensitive adhesive layer. The pressure-sensitive adhesive layer may be arranged on one side of the resin sheet, or may be arranged on each of both sides thereof. The number of the pressure-sensitive adhesive layers may be only one, or may be two or more.

Each layer of the resin sheet with a pressure-sensitive adhesive layer according to the one embodiment of the present invention only needs to be laminated by any appropriate method to the extent that the effects of the present invention are not impaired.

The resin sheet with a pressure-sensitive adhesive layer may include any appropriate other layer in addition to the resin sheet and the pressure-sensitive adhesive layer to the extent that the effects of the present invention are not impaired.

The thickness of the pressure-sensitive adhesive layer is preferably from 5 μm to 200 μm, more preferably from 10 μm to 150 μm, still more preferably from 20 μm to 100 μm, particularly preferably from 30 μm to 80 μm, most preferably from 40 μm to 60 μm.

The thickness of the resin sheet with a pressure-sensitive adhesive layer is preferably from 55 μm to 700 μm, more preferably from 70 μm to 650 μm, still more preferably from 100 μm to 450 μm, particularly preferably from 130 μm to 380 μm, most preferably from 190 μm to 310 μm.

Examples of a pressure-sensitive adhesive forming the pressure-sensitive adhesive layer include a rubber-based pressure-sensitive adhesive (e.g., a synthetic rubber-based pressure-sensitive adhesive or a natural rubber-based pressure-sensitive adhesive), a urethane-based pressure-sensitive adhesive, an acrylic urethane-based pressure-sensitive adhesive, an acrylic pressure-sensitive adhesive, a silicone-based pressure-sensitive adhesive, a polyester-based pressure-sensitive adhesive, a polyamide-based pressure-sensitive adhesive, an epoxy-based pressure-sensitive adhesive, a vinyl alkyl ether-based pressure-sensitive adhesive, a fluorine-based pressure-sensitive adhesive, and a rubber-based pressure-sensitive adhesive. The pressure-sensitive adhesive forming the pressure-sensitive adhesive layer is preferably at least one selected from an acrylic pressure-sensitive adhesive, a silicone-based pressure-sensitive adhesive, and a rubber-based pressure-sensitive adhesive. The number of kinds of such pressure-sensitive adhesives may be only one, or may be two or more. The number of the pressure-sensitive adhesive layers may be one, or may be two or more.

When the pressure-sensitive adhesives are classified in terms of pressure-sensitive adhesive forms, examples thereof include an emulsion-type pressure-sensitive adhesive, a solvent-type pressure-sensitive adhesive, an ultraviolet cross-linking-type (UV cross-linking-type) pressure-sensitive adhesive, an electron beam cross-linking-type (EB cross-linking-type) pressure-sensitive adhesive, and a hot melt-type pressure-sensitive adhesive. The number of kinds of such pressure-sensitive adhesives may be only one, or may be two or more.

The pressure-sensitive adhesive is preferably, for example, a heat-conductive pressure-sensitive adhesive containing heat-conductive particles. When the heat-conductive pressure-sensitive adhesive containing the heat-conductive particles is adopted as the pressure-sensitive adhesive, an influence on the thermal conductivity of the resin sheet with a pressure-sensitive adhesive layer out of changes in characteristics thereof caused by the lamination of the pressure-sensitive adhesive layer can be reduced, and a limitation on the thickness of the layer can be alleviated.

The lower limit value of the thermal conductivity of the heat-conductive pressure-sensitive adhesive is preferably 0.3 W/m·K or more, more preferably 0.4 W/m·K or more, still more preferably 0.5 W/m·K or more, and the upper limit value thereof is preferably 10 W/m·K or less.

The heat-conductive pressure-sensitive adhesive is preferably obtained from a specific pressure-sensitive adhesive raw material containing the heat-conductive particles.

The pressure-sensitive adhesive raw material contains a monomer and/or a polymer, and the heat-conductive particles.

The monomer serving as an essential component is, for example, a (meth)acrylic acid alkyl ester-based monomer, and the monomer serving as an optional component is, for example, a polar group-containing monomer, a polyfunctional monomer, or a copolymerizable monomer copolymerizable with any such monomer.

The number of kinds of the monomers may be only one, or may be two or more.

The content ratio of the monomer in the pressure-sensitive adhesive raw material is preferably from 1 wt % to 45 wt %, more preferably from 10 wt % to 40 wt %.

Examples of the (meth)acrylic acid alkyl ester-based monomer include methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. Of those (meth)acrylic acid alkyl ester-based monomers, a (meth)acrylic acid C2-C12 alkyl ester is preferred, and a (meth)acrylic acid C4-C9 alkyl ester is more preferred, for example, from the viewpoint that adhesive characteristics are easily balanced. The notation "Cx-Cy" means "number x of carbon atoms-number y of carbon atoms".

The lower limit value of the content ratio of the (meth)acrylic acid alkyl ester-based monomer in the monomer is preferably 60 wt % or more, more preferably 80 wt % or more, and the upper limit value thereof is preferably 99 wt % or less.

Examples of the polar group-containing monomer include a nitrogen-containing monomer, a hydroxy group-containing monomer, a sulfo group-containing monomer, a nitrogen and hydroxy group-containing monomer, a nitrogen and sulfo group-containing monomer, a hydroxy group and phosphoric acid group-containing monomer, and a carboxyl group-containing monomer.

Examples of the nitrogen-containing monomer include: cyclic (meth)acrylamides, such as N-(meth)acryloylmorpholine and N-acryloylpyrrolidine; (meth)acrylamide; N-substituted (meth)acrylamides (e.g., N-alkyl (meth)acrylamides, such as N-ethyl (meth)acrylamide and N-n-butyl (meth)acrylamide); N,N-substituted (meth)acrylamides (e.g., N,N-dialkyl (meth)acrylamides, such as N,N-dimethyl (meth)acrylamide, N,N-diethyl (meth)acrylamide, N,N-dipropyl (meth)acrylamide, N,N-diisopropyl (meth)acrylamide, N,N-di(n-butyl) (meth)acrylamide, and N,N-di(t-butyl) (meth)acrylamide); N-vinyl cyclic amides, such as N-vinyl-2-pyrrolidone (NVP), N-vinyl-2-piperidone, N-vinyl-3-morpholinone, N-vinyl-2-caprolactam, N-vinyl-1,3-oxazin-2-one, and N-vinyl-3,5-morpholinedione; amino group-containing monomers, such as aminoethyl (meth)acrylate, N,N-dimethylaminoethyl (meth)acrylate, and N,N-dimethylaminopropyl (meth)acrylate; maleimide skeleton-containing monomers, such as N-cyclohexylmaleimide and N-phenylmaleimide; and itaconimide-based monomers, such as N-methylitaconimide, N-ethylitaconimide, N-butylitaconimide, N-2-ethylhexylitaconimide, N-laurylitaconimide, and N-cyclohexylitaconimide.

Examples of the hydroxy group-containing monomer include 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)methyl methacrylate.

Examples of the sulfo group-containing monomer include styrenesulfonic acid, allylsulfonic acid, sulfopropyl (meth)acrylate, and (meth)acryloyloxynaphthalenesulfonic acid.

Examples of the nitrogen and hydroxy group-containing monomer include N-hydroxyalkyl (meth)acrylamides, such as N-(2-hydroxyethyl) (meth)acrylamide (HEAA), N-(2-hydroxypropyl) (meth)acrylamide, N-(1-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, and N-(4-hydroxybutyl) (meth)acrylamide.

Examples of the nitrogen and sulfo group-containing monomer include 2-(meth)acrylamido-2-methylpropanesulfonic acid, and (meth)acrylamidopropanesulfonic acid.

An example of the hydroxy group and phosphoric acid group-containing monomer is 2-hydroxyethylacryloyl phosphate.

Examples of the carboxyl group-containing monomer include (meth)acrylic acid, itaconic acid, maleic acid, fumaric acid, crotonic acid, isocrotonic acid, maleic anhydride, and itaconic anhydride.

Of the polar group-containing monomers, a nitrogen-containing monomer, a hydroxy group-containing monomer, and a nitrogen and hydroxy group-containing monomer are preferred, and N-vinyl-2-pyrrolidone, N-(meth)acryloylmorpholine, N,N-diethyl (meth)acrylamide, hydroxyethyl (meth)acrylate, hydroxybutyl (meth)acrylate, and N-(2-hydroxyethyl) (meth)acrylamide are more preferred from the viewpoint of imparting a high adhesive property and a high holding force to the pressure-sensitive adhesive layer.

The content ratio of the polar group-containing monomer in the monomer is preferably 5 wt % or more, more preferably from 5 wt % to 30 wt %, still more preferably from 5 wt % to 25 wt %. When the content ratio of the polar group-containing monomer falls within the range, a satisfactory holding force can be imparted to the pressure-sensitive adhesive layer.

The polyfunctional monomer is a monomer having a plurality of ethylene-based unsaturated hydrocarbon groups, and examples thereof include hexanediol (meth)acrylate, (poly)ethylene glycol di(meth)acrylate, (poly) propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, dibutyl (meth)acrylate, and hexidyl (meth)acrylate.

The content ratio of the polyfunctional monomer in the monomer is preferably 2 wt % or less, more preferably from 0.01 wt % to 2 wt %, still more preferably from 0.02 wt % to 1 wt %. When the content ratio of the polyfunctional monomer falls within the range, the adhesive strength of the pressure-sensitive adhesive layer can be improved.

Examples of the copolymerizable monomer include: epoxy group-containing monomers, such as glycidyl(meth)acrylate and allyl glycidyl ether; alkoxy group-containing monomers, such as 2-methoxyethyl (meth)acrylate, 3-methoxypropyl (meth)acrylate, methoxyethylene glycol (meth)acrylate, and methoxypolypropylene glycol (meth)acrylate; cyano group-containing monomers, such as acrylonitrile and methacrylonitrile; styrene-based monomers, such as styrene and α-methylstyrene; α-olefins, such as ethylene, propylene, isoprene, butadiene, and isobutylene; isocyanate group-containing monomers, such as 2-isocyanatoethyl acrylate and 2-isocyanatoethyl methacrylate; vinyl ester-based monomers, such as vinyl acetate and vinyl propionate; vinyl ether-based monomers, such as an alkyl vinyl ether; heterocycle-containing (meth)acrylic acid esters, such as tetrahydrofurfuryl (meth)acrylate; halogen atom-containing monomers, such as a fluoroalkyl (meth)acrylate; alkoxysilyl group-containing monomers, such as 3-methacryloxypropyltrimethoxysilane and vinyltrimethoxysilane; siloxane skeleton-containing monomers, such as (meth)acrylic group-containing silicone; alicyclic hydrocarbon group-containing (meth)acrylates, such as cyclopentyl (meth)acrylate, cyclohexyl (meth)acrylate, bornyl (meth)acrylate, and isobornyl (meth)acrylate; and aromatic hydrocarbon group-containing (meth)acrylates, such as phenyl (meth)acrylate, benzyl (meth)acrylate, phenoxyethyl (meth) acrylate, and phenoxydiethylene glycol (meth)acrylate.

Of the copolymerizable monomers, an alkoxy group-containing monomer is preferred, and 2-methoxyethyl acrylate is more preferred. When an alkoxy group-containing monomer is adopted, the adhesiveness of the pressure-sensitive adhesive layer with an adherend can be improved, and hence heat from the adherend can be efficiently conducted.

The content ratio of the copolymerizable monomer in the monomer is preferably 30 wt % or less, more preferably 20 wt % or less.

The polymer is, for example, a polymer obtained by subjecting a monomer to a reaction. The polymer is specifically, for example, an acrylic polymer, and is more specifically, for example, an acrylic polymer in which a (meth) acrylic acid alkyl ester-based monomer is used as an essential component, and a polar group-containing monomer, a polyfunctional monomer, or a copolymerizable monomer copolymerizable with any such monomer is used as an optional component. The polymer includes a partially polymerized product of any such monomer.

The number of kinds of the polymers may be only one, or may be two or more.

The content ratio of the polymer in the pressure-sensitive adhesive raw material is preferably from 1 wt % to 45 wt %, more preferably from 10 wt % to 40 wt %.

When both of the monomer and the polymer are incorporated into the pressure-sensitive adhesive raw material, the content ratio of the monomer and the polymer in the pressure-sensitive adhesive raw material is preferably from 1 wt % to 45 wt %, more preferably from 10 wt % to 40 wt %.

Each of the heat-conductive particles is, for example, a hydrated metal compound.

The hydrated metal compound is a compound that has a decomposition starting temperature in the range of from 150° C. to 500° C., and is represented by the general formula $M_xO_y \cdot nH_2O$ (where M represents a metal atom, "x" and "y" each represent an integer of 1 or more that is determined by the valence of the metal, and "n" represents the number of molecules of incorporated water of crystallization), or a double salt containing the compound.

Examples of the hydrated metal compound may include aluminum hydroxide [$Al_2O_3 \cdot 3H_2O$; or $Al(OH)_3$], boehmite [$Al_2O_3 \cdot H_2O$; or AlOOH], magnesium hydroxide [$MgO \cdot H_2O$; or $Mg(OH)_2$], calcium hydroxide [$CaO \cdot H_2O$; or $Ca(OH)_2$], zinc hydroxide [$Zn(OH)_2$], silicic acid [$H_4SiO_4$; or $H_2SiO_3$; or $H_2Si_2O_5$], iron hydroxide [$Fe_2O_3 \cdot H_2O$ or $2FeO(OH)$], copper hydroxide [$Cu(OH)_2$], barium hydroxide [$BaO \cdot H_2O$; or $BaO \cdot 9H_2O$], zirconium oxide hydrate [$ZrO \cdot nH_2O$], tin oxide hydrate [$SnO \cdot H_2O$], basic magnesium carbonate [$3MgCO_3 \cdot Mg(OH)_2 \cdot 3H_2O$], hydrotalcite [$6MgO \cdot Al_2O_3 \cdot H_2O$], dawsonite [$Na_2CO_3 \cdot Al_2O_3 \cdot nH_2O$], borax [$Na_2O \cdot B_2O_5 \cdot 5H_2O$], and zinc borate [$2ZnO \cdot 3B_2O_5 \cdot 3.5H_2O$].

The hydrated metal compound is commercially available, and examples thereof include: aluminum hydroxide available under the product name "HIGILITE H-100-ME" (primary average particle diameter: 75 μm) (manufactured by Showa Denko K.K.), the product name "HIGILITE H-10" (primary average particle diameter: 55 μm) (manufactured by Showa Denko K.K.), the product name "HIGILITE H-32" (primary average particle diameter: 8 μm) (manufactured by Showa Denko K.K.), the product name "HIGILITE H-31" (primary average particle diameter: 20 μm) (manufactured by Showa Denko K.K.), the product name "HIGI-LITE H-42" (primary average particle diameter: 1 μm) (manufactured by Showa Denko K.K.), or the product name "B103ST" (primary average particle diameter: 8 μm) (manufactured by Nippon Light Metal Company); and magnesium hydroxide available under the product name "KISUMA 5A" (primary average particle diameter: 1 μm) (manufactured by Kyowa Chemical Industry Co., Ltd.).

Examples of the heat-conductive particles include, in addition to the hydrated metal compound, boron nitride, aluminum nitride, silicon nitride, gallium nitride, silicon carbide, silicon dioxide, aluminum oxide, magnesium oxide, titanium oxide, zinc oxide, tin oxide, copper oxide, nickel oxide, antimonic acid-doped tin oxide, calcium carbonate, barium titanate, potassium titanate, copper, silver, gold, nickel, aluminum, platinum, carbon black, carbon tubes (carbon nanotubes), carbon fibers, and diamond.

The heat-conductive particles are commercially available, and examples thereof include: boron nitride available under the product name "HP-40" (manufactured by Mizushima Ferroalloy Co., Ltd.) or the product name "PT620" (manufactured by Momentive); aluminum oxide available under the product name "AS-50" (manufactured by Showa Denko K.K.) or the product name "AS-10" (manufactured by Showa Denko K.K.); antimonic acid-doped tin available under the product name "SN-100S" (manufactured by Ishihara Sangyo Kaisha, Ltd.), the product name "SN-100P" (manufactured by Ishihara Sangyo Kaisha, Ltd.), or the product name "SN-100D (water dispersion)" (manufactured by Ishihara Sangyo Kaisha, Ltd.); titanium oxide available under the product name "TTO series" (manufactured by Ishihara Sangyo Kaisha, Ltd.); and zinc oxide available under the product name "SnO-310" (manufactured by Sumitomo Osaka Cement Co., Ltd.), the product name "SnO-350" (manufactured by Sumitomo Osaka Cement Co., Ltd.), or the product name "SnO-410" (manufactured by Sumitomo Osaka Cement Co., Ltd.).

The number of kinds of the heat-conductive particles may be only one, or may be two or more.

Each of the heat-conductive particles is preferably, for example, a hydrated metal compound, and is more preferably, for example, aluminum hydroxide in terms of, for example, the impartment of high thermal conductivity and flame retardancy to the pressure-sensitive adhesive layer.

The shape of each of the heat-conductive particles is, for example, a bulk shape, a needle shape, a plate shape, or a layer shape. The bulk shape includes, for example, a spherical shape, a rectangular parallel piped shape, and a crushed shape, and deformed shapes thereof.

The lower limit value of the content ratio of the heat-conductive particles in the pressure-sensitive adhesive raw material is preferably 55 wt % or more, more preferably 60 wt % or more, still more preferably 65 wt % or more, and the upper limit value thereof is preferably 90 wt % or less. When the content ratio of the heat-conductive particles in the pressure-sensitive adhesive raw material falls within the range, a high thermal conductivity and flame retardancy can be imparted to the pressure-sensitive adhesive layer.

The heat-conductive particles preferably contain first heat-conductive particles having a first particle size distribution and second heat-conductive particles having a second particle size distribution.

The heat-conductive particles preferably contain 10 wt % to 80 wt % of the first heat-conductive particles whose primary particles have an average particle diameter on a volume basis of 5 μm or less, and 20 wt % to 90 wt % of the second heat-conductive particles whose primary particles have an average particle diameter on a volume basis of more than 5 µm.

In the particle size distribution of the first heat-conductive particles (first particle size distribution), the upper limit value of the average particle diameter of the primary particles on a volume basis is preferably less than 5 µm, more preferably 2 µm or less, and the lower limit value thereof is preferably 0.1 µm or more.

In the particle size distribution of the second heat-conductive particles (second particle size distribution), the lower limit value of the average particle diameter of the primary particles on a volume basis is preferably 5 µm or more, more preferably 7 µm or more, and the upper limit value thereof is preferably 30 µm or less.

Each of the particle size distributions is determined by a particle size distribution measurement method in a laser scattering method. Specifically, the particle size distribution may be measured with a laser scattering particle size distribution meter. The average particle diameter of the primary particles on a volume basis is determined as a D50 value (cumulative 50% median diameter) on the basis of the measured particle size distribution.

The content ratio of the first heat-conductive particles in the heat-conductive particles is preferably from 10 wt % to 80 wt %, more preferably from 20 wt % to 80 wt %, still more preferably from 30 wt % to 60 wt %.

The content ratio of the second heat-conductive particles in the heat-conductive particles is preferably from 20 wt % to 90 wt %, more preferably from 20 wt % to 80 wt %, still more preferably from 30 wt % to 60 wt %.

The pressure-sensitive adhesive raw material may be prepared by any appropriate method to the extent that the effects of the present invention are not impaired.

To prepare the pressure-sensitive adhesive raw material, first, for example, a monomer composition containing the monomer and a polymerization initiator is prepared, or the polymer is dissolved in a solvent such as an organic solvent to prepare a polymer composition.

To prepare the monomer composition, first, the monomer is compounded with the polymerization initiator. The polymerization initiator may be compounded in any appropriate amount to the extent that the effects of the present invention are not impaired.

Examples of the polymerization initiator include a photopolymerization initiator and a thermal polymerization initiator. The number of kinds of the polymerization initiators may be only one, or may be two or more.

Examples of the photopolymerization initiator include a benzoin ether-based photopolymerization initiator, an acetophenone-based photopolymerization initiator, an α-ketol-based photopolymerization initiator, an aromatic sulfonyl chloride-based photopolymerization initiator, a photoactive oxime-based photopolymerization initiator, a benzoin-based photopolymerization initiator, a benzil-based photopolymerization initiator, a benzophenone-based photopolymerization initiator, and a thioxanthone-based photopolymerization initiator.

Examples of the thermal polymerization initiator include: azo-based polymerization initiators, such as 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropane) dihydrochloride, 2,2'-azobis[2-(5-methyl-2-imidazolin-2-yl)propane] dihydrochloride, 2,2'-azobis(2-methylpropionamidine) disulfate, 2,2'-azobis(N,N'-dimethyleneisobutylamidine) hydrochloride, and 2,2'-azobis [N-(2-carboxyethyl)-2-methylpropionamidine] hydrate; peroxide-based polymerization initiators, such as dibenzoyl peroxide, t-butyl permaleate, t-butyl hydroperoxide, and hydrogen peroxide; persulfates, such as potassium persulfate and ammonium persulfate; and redox-based polymerization initiators, such as a combination of a persulfate and sodium hydrogen sulfite and a combination of a peroxide and sodium ascorbate.

To prepare the monomer composition, next, part of the monomer is polymerized as required.

To polymerize part of the monomer, in the case where the monomer is compounded with a photopolymerization initiator, the mixture of the monomer and the photopolymerization initiator is irradiated with UV light. At the time of the UV irradiation, the irradiation is performed at such irradiation energy that the photopolymerization initiator is excited until the viscosity of the monomer composition (BH viscometer, No. 5 rotor, 10 rpm, measurement temperature: 30° C.) becomes preferably from 5 Pa·s to 30 Pa·s, more preferably from 10 Pa·s to 20 Pa·s.

To polymerize part of the monomer, in the case where the monomer is compounded with a thermal polymerization initiator, the mixture of the monomer and the thermal polymerization initiator is heated at, for example, a polymerization temperature equal to or more than the decomposition temperature of the thermal polymerization initiator, specifically, for example, from about 20° C. to about 100° C. until the viscosity of the monomer composition (BH viscometer, No. 5 rotor, 10 rpm, measurement temperature: 30° C.) becomes preferably from 5 Pa·s to 30 Pa·s, more preferably from 10 Pa·s to 20 Pa·s as in the case where the monomer is compounded with a photopolymerization initiator.

When part of the monomer is polymerized to prepare the monomer composition, for example, first, the (meth)acrylic acid alkyl ester-based monomer, a monomer selected from a polar group-containing monomer and a copolymerizable monomer, and the polymerization initiator are compounded with each other, and part of the monomers are polymerized as required. After that, a polyfunctional monomer is compounded into the resultant.

Thus, the monomer composition is prepared.

The monomer composition or the polymer composition may be compounded with an additive such as a dispersant, a tackifier, an acrylic oligomer, a silane coupling agent, a fluorine-based surfactant, a plasticizer, a filler, an age inhibitor, or a colorant as required. The additive may be compounded into the monomer composition or the polymer composition under a state of being dispersed or dissolved in a solvent such as an organic solvent.

Next, to prepare the pressure-sensitive adhesive raw material, the resultant monomer composition or polymer composition is compounded and mixed with the heat-conductive particles. The heat-conductive particles may be compounded into the monomer composition or the polymer composition under a state of being dispersed or dissolved in a solvent such as an organic solvent.

Thus, the pressure-sensitive adhesive raw material is prepared.

The viscosity of the pressure-sensitive adhesive raw material (BM viscometer, No. 4 rotor, 12 rpm, measurement temperature: 23° C.) is preferably 50 Pa·s or less, more preferably from 5 Pa·s to 40 Pa·s, still more preferably from 10 Pa·s to 35 Pa·s.

Cells may be incorporated into the pressure-sensitive adhesive raw material to provide a foam.

To incorporate the cells into the pressure-sensitive adhesive raw material, for example, the following is performed: a stirring apparatus including a stator (fixed teeth) having many teeth on a disc having a through-hole in its central portion, and a rotor (rotary teeth) that is opposite to the stator and has many teeth on a disc is used; the pressure-sensitive adhesive raw material is introduced into a space between the teeth of the stator and the teeth of the rotor; and while the rotor is rotated at a high speed, a gas for forming the cells is introduced into the pressure-sensitive adhesive raw material through the through-hole of the stator.

Examples of the gas to be introduced into the pressure-sensitive adhesive raw material include: inert gases, such as nitrogen, carbon dioxide, and argon; and air.

The introduction ratio of the cells with respect to the total volume of the pressure-sensitive adhesive raw material is preferably from 5 vol % to 50 vol %, more preferably from 10 vol % to 40 vol %, still more preferably from 12 vol % to 35 vol %.

The heat-conductive pressure-sensitive adhesive may be obtained by, for example, applying the pressure-sensitive adhesive raw material onto the release-treated surface of a base film and (1) arranging a cover film on the formed coating film (preferably so that the release-treated surface of the cover film may be in contact with the coating film), followed by the irradiation of the resultant with UV light (e.g., when the raw material is compounded with a photo-polymerization initiator) or the heating thereof (e.g., when the raw material is compounded with a thermal polymerization initiator). Alternatively, the pressure-sensitive adhesive may be obtained by (2) drying the coating film to remove its solvent (e.g., when the polymer composition is compounded into the pressure-sensitive adhesive raw material or when the heat-conductive particles and the additive are compounded into the pressure-sensitive adhesive raw material after having been dispersed or dissolved in a solvent). In this case, the heat-conductive pressure-sensitive adhesive becomes laminar, and hence may serve as a pressure-sensitive adhesive layer.

Examples of the base film include: polyester films (e.g., a polyethylene terephthalate film); fluorine-based films formed of fluorine-based polymers (e.g., polytetrafluoroethylene, polychlorotrifluoroethylene, polyvinyl fluoride, polyvinylidene fluoride, a tetrafluoroethylene-hexafluoropropylene copolymer, and a chlorofluoroethylene-vinylidene fluoride copolymer); olefin-based resin films formed of olefin-based resins (e.g., polyethylene and polypropylene); plastic-based base material films (synthetic resin films), such as a polyvinyl chloride film, a polyimide film, a polyamide film (a nylon film), and a rayon film; papers, such as woodfree paper, Japanese paper, kraft paper, glassine paper, synthetic paper, and topcoat paper; and composites each formed by multilayering those films.

Examples of a method of applying the pressure-sensitive adhesive raw material to the base film include roll coating, kiss roll coating, gravure coating, reverse coating, roll brushing, spray coating, dip roll coating, bar coating, knife coating, air knife coating, curtain coating, lip coating, and an extrusion coating method with a die coater or the like.

The application thickness of the pressure-sensitive adhesive raw material is preferably from 10 μm to 500 μm, more preferably from 20 μm to 300 μm, still more preferably from 30 μm to 100 μm.

The thickness of the pressure-sensitive adhesive layer formed from the heat-conductive pressure-sensitive adhesive is preferably from 10 μm to 500 μm, more preferably from 20 μm to 300 μm, still more preferably from 30 μm to 100 μm.

The tensile modulus of elasticity of the heat-conductive pressure-sensitive adhesive is preferably from 0.1 MPa to 10 MPa, more preferably from 0.2 MPa to 8 MPa, still more preferably from 0.5 MPa to 5 MPa.

The lower limit value of the 90-degree peeling adhesive strength of the heat-conductive pressure-sensitive adhesive (adhesive strength when the pressure-sensitive adhesive is bonded to a stainless-steel plate, and is then peeled at a peel angle of 90° and a peel rate of 300 mm/min from the stainless-steel plate) is preferably 3 N/20 mm or more, more preferably 6 N/20 mm or more, still more preferably 10 N/20 mm or more, and the upper limit value thereof is preferably 100 N/20 mm or less.

The upper limit value of the hardness of the heat-conductive pressure-sensitive adhesive (measured in conformity with a type C hardness test specified in JIS K 7312) measured 30 seconds after the pressurization surface of a type C durometer has been brought into close contact therewith is preferably 90 or less, more preferably 80 or less, and the lower limit value thereof is preferably 1 or more.

EXAMPLES

Now, the present invention is described specifically by way of Examples. However, the present invention is by no means limited to Examples. Test and evaluation methods in Examples and the like are as described below. The term "part(s)" in the following description means "part(s) by weight" unless otherwise specified, and the term "%" in the following description means "wt %" unless otherwise specified.

<Measurement of 50% Compression Load>

Measurement was performed in conformity with a compressive hardness measurement method described in JIS K6767. A sheet serving as a measurement object was cut into a size measuring 30 mm by 30 mm, and its thickness was adjusted to 10 mm (by, for example, laminating the 50 sheets when the thickness of the sheet was 0.2 mm). Thus, a sheet-shaped test piece was obtained. At this time, the test piece measuring 30 mm by 30 mm by 10 mm was formed into a substantially rectangular parallelepiped shape. Next, the test piece was compressed at 23±5° C. and a compression speed of 10 mm/min in its thickness direction until its compressibility became 50%. A stress (N) at that time was converted into a value per unit area (1 cm$^2$), and the resultant value was adopted as a 50% compression load.

<Measurement of Poisson's Ratio>

A sheet-shaped test piece obtained as follows was mounted on the sample placement surface of a microautograph (manufactured by Shimadzu Corporation, MST-200NX): a sheet serving as a measurement object was cut into a size measuring 10 mm by 10 mm, and its thickness was adjusted to 1 mm (by, for example, laminating the 5 sheets when the thickness of the sheet was 0.2 mm). At this time, the test piece measuring 10 mm by 10 mm by 1 mm was formed into a substantially rectangular parallelepiped shape. A camera was arranged at such a position that the camera directly confronted the test piece. That is, the camera was arranged so that a 10-millimeter side of the test piece was projected so as to have the longest length when viewed from the camera. The compression jig of the autograph was moved at 23° C. and a speed of 10 mm/min to compress the test piece until its thickness became 0.2 mm. The length X (mm) of the side whose length had been 10 mm before the compression after the compression was determined from an image obtained at that time, and the Poisson's ratio of the test piece was determined from the following equation:

$$\text{Poisson's ratio} = |\{(X-10)/10\}/\{(0.2-1)/1\}|$$

(where the symbol "| (numerical value A)|" represents the absolute value of the numerical value A).

<Measurement of Thickness Recovery Ratio>

A sheet serving as a measurement object was cut into a size measuring 10 mm by 10 mm, and its thickness was adjusted to 1 mm (by, for example, laminating the 5 sheets when the thickness of the sheet was 0.2 mm). Thus, a sheet-shaped test piece was obtained. At this time, the test piece measuring 10 mm by 10 mm by 1 mm was formed into a substantially rectangular parallelepiped shape. The test piece was compressed with a compression tester (manufactured by Shimadzu Corporation, MICRO-SERVO) at 23° C. in its thickness direction to a thickness corresponding to 20% of its initial thickness (1 mm) for 1 minute, followed by the release of the compression. The recovery behavior of the thickness 1 second after the release of the compression was taken with a high-speed camera. The thickness recovery ratio of the test piece was represented as the ratio of the thickness 1 second after the release of the compression to the initial thickness.

<Measurement of Cell Wall Ratio of Foam Resin>

A section obtained when a sheet of a foam resin serving as a measurement object was cut in a direction parallel to its machine direction (MD) was observed with a microscope (manufactured by Keyence Corporation, VHX-900F, ring lighting: OP-72404, magnification: 100), and the ratio of cell walls (serving as white portions) when a sectional cell image thus taken was binarized with image processing software "ImageJ" at a threshold value of "75" was adopted as a "cell wall ratio".

<Measurement of Average Cell Diameter of Foam Resin>

A sheet of a foam resin serving as a measurement object was cut in a direction parallel to a direction perpendicular to its machine direction (MD direction) with a cutter, and the sheet of the foam resin serving as a measurement object was cut in a direction (thickness direction) vertical to its main surface (surface to be extended) with a cutter. Thus, smooth sections were produced. Those sections were observed with a digital microscope (manufactured by Keyence Corporation, VHX-500), and the resultant enlarged image of the cells of the sheet of the foam resin serving as a measurement object was captured in the analysis software (manufactured by Mitani Corporation, Win ROOF) of the measuring instrument, followed by the analysis of the image with the software. Thus, the average cell diameter (μm) of the sheet was determined. Cells having 10 largest areas out of the cells in the enlarged image were used in the analysis, and their average diameter was calculated. The calculated value was adopted as the average cell diameter.

<Measurement of Apparent Density of Foam Resin>

A sheet of a foam resin serving as a measurement object was punched into a size measuring 40 mm by 40 mm to provide a test piece, and the dimensions of the test piece were measured. In addition, the thickness of the test piece was measured with a 1/100 dial gauge having a measuring terminal of φ20 mm. The volume of the sheet serving as a measuring object was calculated from those values. Next, the mass of the sheet serving as a measuring object was measured with an even balance having a minimum scale of 0.01 g or more. The apparent density of the sheet serving as a measuring object was calculated from those values.

$$\text{Apparent density}(g/cm^3) = \text{mass of test piece/volume of test piece}$$

<Measurement of Thermal Conductivity of Foam Resin>

Foams each having a sufficient volume were cut out of a foam resin, and were laminated, followed by the compression of the laminate with a vacuum press machine having a heating function for 1 minute. Thus, a resin sheet having a thickness of 0.3 mm was obtained. A heating temperature was set so as to be close to the melting point of the foam resin and to fall within such a range that a situation in which the resin did not melt or was deteriorated by heat did not occur.

Figure 2A:
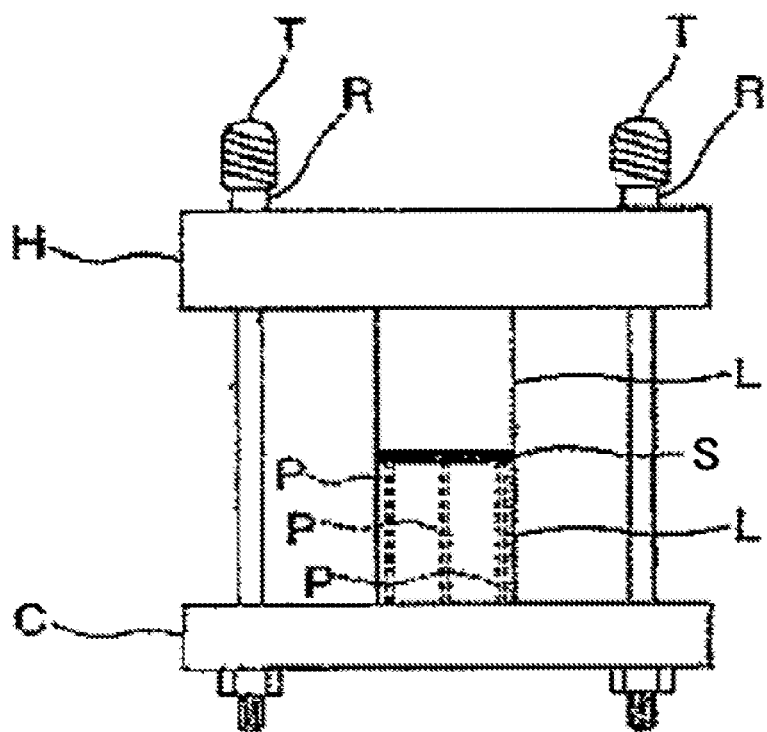
FIGS. 2(a) and (2b) are each a schematic sectional view of a thermal characteristic-evaluating apparatus.
Figure 2B:
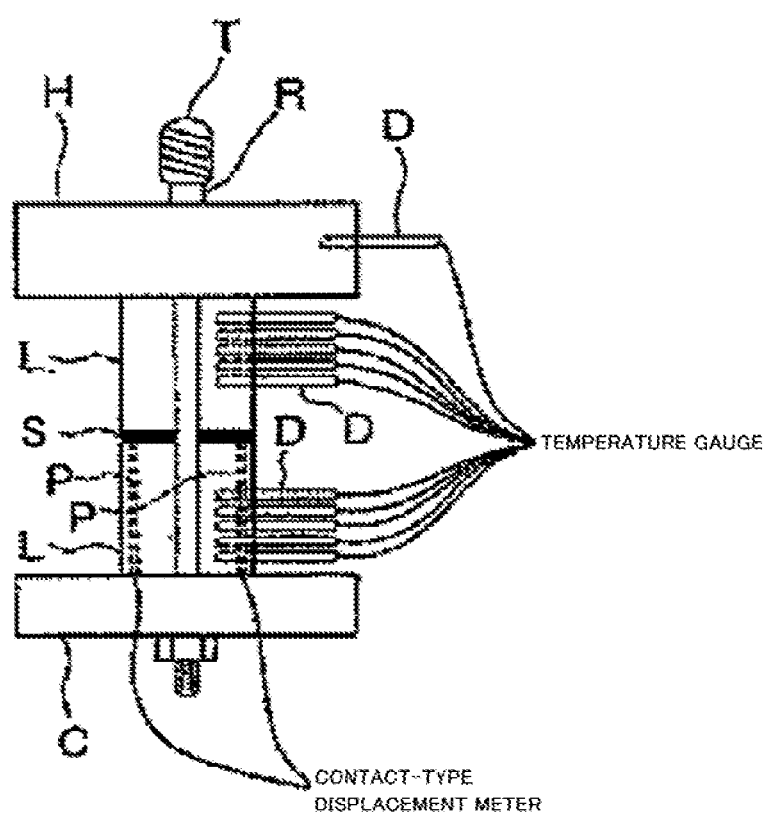

The thermal conductivity of the sheet was measured with a thermal characteristic-evaluating apparatus illustrated in each of FIG. 2 (FIG. 2(a) is a front view and FIG. 2(b) is a side view). Specifically, a heat-conductive pressure-sensitive adhesive S (measuring 20 mm by 20 mm) was sandwiched between a pair of blocks (sometimes referred to as "rods") L made of aluminum (A5052, thermal conductivity: 140 W/m·K), which had each been formed so as to be a cube 20 mm on a side, and the blocks L forming a pair were bonded to each other with the adhesive sheet. Then, the pair of blocks L was arranged between a heater (heater block) H and a radiator (cooling base plate configured to circulate cooling water therein) C so that the blocks were vertically arranged. Specifically, the heater H was arranged above the upper block L, and the radiator C was arranged below the lower block L. At this time, the pair of blocks L, the blocks being bonded to each other with the heat-conductive pressure-sensitive adhesive S, is positioned between a pair of screws T for pressure adjustment penetrating the heater H and the radiator C. A load cell R is arranged between each of the screws T for pressure adjustment and the heater H, and is configured so that a pressure when the screw T for pressure adjustment is fastened may be measured. Such pressure was used as a pressure applied to the heat-conductive pressure-sensitive adhesive S. Specifically, in this test, the screws T for pressure adjustment were fastened so that a pressure applied to the heat-conductive pressure-sensitive adhesive S became 25 N/cm² (250 kPa). In addition, three probes P (each having a diameter of 1 mm) of a contact-type displacement meter were arranged so as to penetrate the lower block L and the heat-conductive pressure-sensitive adhesive S from the radiator C side. At this time, the upper end portions of the probes P are each in a state of being in contact with the lower surface of the upper block L, and are configured so as to be capable of measuring an interval between the upper and lower blocks L (the thickness of the heat-conductive pressure-sensitive adhesive S). Temperature sensors D were attached to the heater H, and the upper and lower blocks L. Specifically, the temperature sensor D was attached to one site of the heater H, and the temperature sensors D were attached to five sites of each block L in a vertical direction at intervals of 5 mm. In the measurement, first, the screws T for pressure adjustment were fastened to apply a pressure to the heat-conductive pressure-sensitive adhesive S, and the temperature of the heater H was set to 80° C. In addition, cooling water at 20° C. was circulated in the radiator C. Then, after the temperatures of the heater H, and the upper and lower blocks L had been stabilized, the temperatures of the upper and lower blocks L were measured with the respective temperature sensors D, and a heat flux passing through the heat-conductive pressure-sensitive adhesive S was calculated from the thermal conductivities (W/m·K) of the upper and lower blocks L, and a temperature gradient between the blocks. In addition, the temperature of an interface between each of the upper and lower blocks L, and the heat-conductive pressure-sensitive adhesive S was calculated. Then, the thermal conductivity (W/m·K) and thermal resistance (cm$^2$·K/W) of the sheet at the pressure were calculated from the following thermal conductivity equations (Fourier's law) by using those values.

$Q=-\lambda \mathrm{grad}T$ $R=L/\lambda$

Q: heat flux per unit area
gradT: temperature gradient
L: thickness of sheet
λ: thermal conductivity
R: thermal resistance <Evaluation of Partial Heatability>

A ceramic heater (25-millimeter square) including a thermocouple was placed on a stage formed from a polycarbonate (PC) plate having a thickness of 2 mm. A sheet serving as a measurement object was cut into a size measuring 25 mm by 25 mm, and was bonded onto the ceramic heater. After that, a PC plate (measuring 160 mm by 160 mm by 2 mm) to be used as a casing was assembled from above the heater. A space between the PC plate serving as the casing and the ceramic heater was set to 0.2 mm. A PET film having a thickness of 0.1 mm was bonded to the left half of the PC plate to arrange a step of 0.1 mm in the space. An electric current of 2 A was flowed in the ceramic heater to heat the ceramic heater, and the temperature of the ceramic heater 5 minutes thereafter was measured with the thermocouple, followed by the measurement of the surface temperature of the casing with a thermography (manufactured by NEC Corporation, TH7800). The heat distribution image obtained by the measurement with the thermography was analyzed with a report-generating program (manufactured by NEC San-ei Instruments, Ltd., NS9200), and the temperatures of left and right points each of which was distant from the central portion of the heater by 9 mm were observed. The temperature of the side on which the PET film was present was represented by A, and the temperature of the side on which the film was absent was represented by B. The value of A-B was adopted as an indicator of the evaluation of partial heatability.

<Measurement of Thermal Conductivity and Thermal Resistance of Heat-Conductive Pressure-Sensitive Adhesive>

The thermal conductivity and thermal resistance of a heat-conductive pressure-sensitive adhesive were measured with a thermal characteristic-evaluating apparatus illustrated in each of FIG. 2 (FIG. 2(a) is a front view and FIG. 2(b) is a side view). Specifically, a heat-conductive pressure-sensitive adhesive S (measuring 20 mm by 20 mm) was sandwiched between a pair of blocks (sometimes referred to as "rods") L made of aluminum (A5052, thermal conductivity: 140 W/m·K), which had each been formed so as to be a cube 20 mm on a side, and the blocks L forming a pair were bonded to each other with the adhesive sheet. Then, the pair of blocks L was arranged between a heater (heater block) H and a radiator (cooling base plate configured to circulate cooling water therein) C so that the blocks were vertically arranged. Specifically, the heater H was arranged above the upper block L, and the radiator C was arranged below the lower block L. At this time, the pair of blocks L, the blocks being bonded to each other with the heat-conductive pressure-sensitive adhesive S, is positioned between a pair of screws T for pressure adjustment penetrating the heater H and the radiator C. A load cell R is arranged between each of the screws T for pressure adjustment and the heater H, and is configured so that a pressure when the screw T for pressure adjustment is fastened may be measured. Such pressure was used as a pressure applied to the heat-conductive pressure-sensitive adhesive S. Specifically, in this test, the screws T for pressure adjustment were fastened so that a pressure applied to the heat-conductive pressure-sensitive adhesive S became 25 N/cm$^2$ (250 kPa). In addition, three probes P (each having a diameter of 1 mm) of a contact-type displacement meter were arranged so as to penetrate the lower block L and the heat-conductive pressure-sensitive adhesive S from the radiator C side. At this time, the upper end portions of the probes P are each in a state of being in contact with the lower surface of the upper block L, and are configured so as to be capable of measuring an interval between the upper and lower blocks L (the thickness of the heat-conductive pressure-sensitive adhesive S). Temperature sensors D were attached to the heater H, and the upper and lower blocks L. Specifically, the temperature sensor D was attached to one site of the heater H, and the temperature sensors D were attached to five sites of each block L in a vertical direction at intervals of 5 mm. In the measurement, first, the screws T for pressure adjustment were fastened to apply a pressure to the heat-conductive pressure-sensitive adhesive S, and the temperature of the heater H was set to 80° C. In addition, cooling water at 20° C. was circulated in the radiator C. Then, after the temperatures of the heater H, and the upper and lower blocks L had been stabilized, the temperatures of the upper and lower blocks L were measured with the respective temperature sensors D, and a heat flux passing through the heat-conductive pressure-sensitive adhesive S was calculated from the thermal conductivities (W/m·K) of the upper and lower blocks L, and a temperature gradient between the blocks. In addition, the temperature of an interface between each of the upper and lower blocks L, and the heat-conductive pressure-sensitive adhesive S was calculated. Then, the thermal conductivity (W/m·K) and thermal resistance (cm$^2$·K/W) of the sheet at the pressure were calculated from the following thermal conductivity equations (Fourier's law) by using those values.

$Q=-\lambda \mathrm{grad}T$ $R=L/\lambda$

Q: heat flux per unit area
gradT: temperature gradient
L: thickness of sheet
λ: thermal conductivity
R: thermal resistance <Measurement of Viscosity of Pressure-sensitive Adhesive Raw Material that is Raw Material for Heat-Conductive Pressure-Sensitive Adhesive>

The viscosity of a pressure-sensitive adhesive raw material was measured with a BM viscometer (No. 4 rotor, 12 rpm, measurement temperature: 23° C.)

<Measurement of Tensile Modulus of Elasticity and Elongation of Heat-Conductive Pressure-Sensitive Adhesive>

A heat-conductive pressure-sensitive adhesive was cut into a size measuring 10 mm wide by 60 mm long to provide a sample, and the tensile test of the sample was performed in conformity with JIS K 6767. A base film and a cover film were peeled from the sample, and the stress-strain curve of the remainder was measured under an atmosphere at 23° C. and 50% RH with a universal tensile tester "TCM-1kNB" (manufactured by Minebea Co., Ltd.) at a chuck-to-chuck distance of 20 mm and a tensile rate of 300 mm/min. The tensile strength and elongation of the sample were calculated from the measured stress-strain curve by using the following equations. In addition, a tangent was drawn to the initial rise-up portion of the resultant stress-strain curve, and a load (N) when the tangent corresponded to an elongation of 100% was divided by the sectional area (mm²) of the sample. The resultant value was adopted as a tensile modulus of elasticity (MPa).

Tensile strength (MPa)=maximum load (N) immediately before rupture of sample/sectional area (mm²) of sample Elongation (%)={(chuck-to-chuck distance (mm) of sample at time of rupture−20 (mm))/20 (mm)}× 100

<Measurement of 90-degree Peeling Adhesive Strength of Heat-conductive Pressure-sensitive Adhesive>

The base film (or cover film) of a heat-conductive pressure-sensitive adhesive was peeled, and a PET film having a thickness of 25 μm was bonded to the remainder. The resultant was cut into a size measuring 20 mm wide by 150 mm long to provide an evaluation sample. The remaining cover film (or base film) was peeled from the evaluation sample, and the heat-conductive pressure-sensitive adhesive was bonded to an aluminum plate (#1050) under an atmosphere at 23° C. and 50% RH. A 2-kilogram roller was reciprocated from above the PET film once to press the heat-conductive pressure-sensitive adhesive against the aluminum plate. After the pressure-sensitive adhesive had been cured at 23° C. for 30 minutes, its 90-degree peeling adhesive strength was measured with a universal tensile tester "TCM-1kNB" (manufactured by Minebea Co., Ltd.) at a peel angle of 90° and a tensile rate of 300 mm/min in conformity with JIS Z 0237.

<Measurement of Hardness of Heat-Conductive Pressure-Sensitive Adhesive>

A test was performed by using a heat-conductive pressure-sensitive adhesive in conformity with JIS K 7312 under the following conditions. In detail, the heat-conductive pressure-sensitive adhesive was cut into a piece measuring 20 mm wide by 20 mm long, and such pieces were laminated so as to have a thickness of 4 mm. The resultant laminate was used as an evaluation sample, and under an atmosphere at 23° C. and 50% RH, its hardness (Asker C hardness) 30 seconds after the pressurization surface of an Asker C hardness meter (manufactured by Kobunshi Keiki Co., Ltd.) had been brought into close contact with the sample was measured with the Asker C hardness meter.

<Measurement of Holding Force of Heat-Conductive Pressure-Sensitive Adhesive>

A heat-conductive pressure-sensitive adhesive was cut into a size measuring 20 mm by 10 mm, and was then bonded to a PET film having a thickness of 25 μm. Thus, a sample was obtained. Next, under an environment at 23° C. and 50% RH, the peeling surface of a portion measuring 10 mm by 20 mm in the upper end portion of the sample was mounted on the lower end portion of a stainless-steel (SUS304BA) plate, and a 2-kilogram roller was reciprocated once to bond the heat-conductive pressure-sensitive adhesive to the stainless-steel plate. After that, the resultant was left at rest under an environment at 80° C. for 30 minutes to stabilize (cure) the bonded (adhered) state. After that, the upper end portion of the stainless-steel plate was fixed, and a weight of 300 g was hung down from the lower end portion of the sample under the condition of 80° C. Then, the shift amount (moving distance) of the sample with respect to the stainless-steel plate when the sample was left to stand under the environment at 80° C. for 1 hour was measured.

Example 1

52 Parts by weight of polypropylene (melt flow rate (MFR): 0.35 g/10 min), 48 parts by weight of the mixture of a thermoplastic olefin-based elastomer (ethylene-propylene copolymer elastomer) and a softening agent (paraffin-based extender oil) (MFR (230° C.) 6 g/10 min, JIS A hardness: 79°, obtained by compounding 100 parts by weight of the polyolefin-based elastomer with 30 parts by weight of the softening agent), 5 parts by weight of carbon black (product name: "ASAHI #35", manufactured by Asahi Carbon Co., Ltd.), 10 parts by weight of magnesium hydroxide, 3 parts by weight of stearic acid monoglyceride, and 1 part by weight of a fatty acid amide (lauric acid bisamide) were kneaded with a biaxial kneader manufactured by the Japan Steel Works, Ltd. (JSW) at a temperature of 200° C. After that, the kneaded product was extruded into a strand shape, and was cooled with water, followed by forming into a pellet shape. The pellet was loaded into a monoaxial extruder manufactured by the Japan Steel Works, Ltd., and under an atmosphere at 220° C., a carbon dioxide gas was injected into the pellet at a pressure of 13 (12 after the injection) MPa. The carbon dioxide gas was injected at a ratio of 5.6 wt % with respect to the total amount of the pellet. After the carbon dioxide gas had been sufficiently saturated, the pellet was cooled to a temperature suitable for foaming, and was extruded from a die into a cylindrical shape. The cylindrical foam was passed through a space between a mandrel configured to cool the inner surface of a foam and an air ring for cooling a foam configured to cool the outer surface of the cylindrical foam extruded from the annular die of the extruder, and part of its diameter was cut to develop the foam into a sheet shape. Thus, an elongate foam raw material was obtained. The elongate foam raw material was cut into a predetermined width (slitting), and a low-foaming layer on its surface was peeled off one by one with a continuous slicing apparatus (slicing line). Thus, a resin foam (1) (thickness: 0.30 mm) was obtained.

One surface of the resin foam (1) was subjected to a melting treatment with heat by passing the foam through the inside of a continuous treating apparatus in which the temperature of each of induction heat generation rolls was set to 200° C., and a gap therebetween was set to 0.2 mm. Thus, a resin sheet (1) was obtained. The take-up speed of the sheet was set to 20 m/min.

Various results of the resin foam (1) and the resin sheet (1) thus obtained are shown in Table 1.

Example 2

A resin foam (2) and a resin sheet (2) were obtained in the same manner as in Example 1 except that the materials to be kneaded with the biaxial kneader manufactured by the Japan Steel Works, Ltd. (JSW) were changed to 42 parts by weight of polypropylene (melt flow rate (MFR): 0.45 g/10 min), 55 parts by weight of the mixture of a thermoplastic olefin-based elastomer (ethylene-propylene copolymer elastomer) and a softening agent (paraffin-based extender oil) (MFR (230° C.): 6 g/10 min, JIS A hardness: 79°, obtained by compounding 100 parts by weight of the polyolefin-based elastomer with 30 parts by weight of the softening agent), 1 part by weight of carbon black (product name: "ASAHI #35", manufactured by Asahi Carbon Co., Ltd.), 10 parts by weight of magnesium hydroxide, 1.2 parts by weight of stearic acid monoglyceride, and 2.5 parts by weight of a fatty acid amide (lauric acid bisamide).

Various results of the resin foam (2) and the resin sheet (2) thus obtained are shown in Table 1.

Example 3

(Production of Resin Foam (3) and Resin Sheet (3))

A resin foam (3) and a resin sheet (3) were obtained in the same manner as in Example 1 except that the materials to be kneaded with the biaxial kneader manufactured by the Japan Steel Works, Ltd. (JSW) were changed to 52 parts by weight of polypropylene (melt flow rate (MFR): 0.40 g/10 min), 48 parts by weight of the mixture of a thermoplastic olefin-based elastomer (ethylene-propylene copolymer elastomer) and a softening agent (paraffin-based extender oil) (MFR (230° C.): 6 g/10 min, JIS A hardness: 79°, obtained by compounding 100 parts by weight of the polyolefin-based elastomer with 30 parts by weight of the softening agent), 5 parts by weight of carbon black (product name: "ASAHI #35", manufactured by Asahi Carbon Co., Ltd.), 10 parts by weight of magnesium hydroxide, 3 parts by weight of stearic acid monoglyceride, and 1 part by weight of a fatty acid amide (lauric acid bisamide).

(Production of Heat-Conductive Pressure-Sensitive Adhesive (3))

90 Parts by weight of 2-ethylhexyl acrylate and 10 parts by weight of N-vinyl-2-pyrrolidone (NVP) serving as monomers were compounded and mixed with each other to provide a mixture of the monomers. The resultant mixture was compounded with 0.05 part by weight of 2,2-dimethoxy-1,2-diphenylethan-1-one (product name: "IRGACURE 651", manufactured by BASF) and 0.05 part by weight of 1-hydroxycyclohexyl phenyl ketone (product name: "IRGACURE 184", manufactured by BASF) serving as photopolymerization initiators. After that, UV light was applied to the mixture to polymerize the mixture until its viscosity (BH viscometer, No. 5 rotor, 10 rpm, measurement temperature: 30° C.) became about 20 Pa·s. Thus, a partially polymerized product (syrupy) of the monomers in which part of the monomers were polymerized was prepared. 100 Parts by weight of the resultant partially polymerized product of the monomers was compounded and mixed with 0.05 part by weight of dipentaerythritol hexaacrylate (product name: "KAYARAD DPHA-40H", manufactured by Nippon Kayaku Co., Ltd.) serving as a polyfunctional monomer and 3.4 parts by weight of a product available under the product name "PLYSURF A212E" (manufactured by DKS Co., Ltd.) serving as a dispersant. Thus, a monomer composition was prepared.

Next, the resultant monomer composition was compounded and mixed with 100 parts by weight of aluminum hydroxide powder having an average particle diameter (on a volume basis) of 1 μm and a maximum particle diameter (on a volume basis) of less than 10 μm (product name: "HIGILITE H-42", shape: crushed shape, manufactured by Showa Denko K.K.), the powder serving as first heat-conductive particles, and 100 parts by weight of aluminum hydroxide powder having an average particle diameter (on a volume basis) of 8 μm and a maximum particle diameter (on a volume basis) of 30 μm or more (product name: "HIGILITE H-32", shape: crushed shape, manufactured by Showa Denko K.K.), the powder serving as second heat-conductive particles. Thus, a pressure-sensitive adhesive raw material was prepared. The viscosity of the pressure-sensitive adhesive raw material (BM viscometer, No. 4 rotor, 12 rpm, measurement temperature: 23° C.) is shown in Table 3.

One surface of a base film (polyethylene terephthalate film, product name: "DIAFOIL MRF38", manufactured by Mitsubishi Chemical Polyester Film Corporation) was subjected to a release treatment, and the resultant pressure-sensitive adhesive raw material was applied to the release-treated surface of the base film so that its thickness after drying and curing became 50 μm. Next, a cover film (the same film as the base film) was arranged on the coating film of the pressure-sensitive adhesive raw material so that the coating film of the pressure-sensitive adhesive raw material was sandwiched between the cover film and the base film. Next, both sides (base film side and cover film side) of the pressure-sensitive adhesive raw material were irradiated with UV light (illuminance: about 5 mW/cm$^2$) for 3 minutes. Thus, the monomers in the pressure-sensitive adhesive raw material were polymerized, and hence a heat-conductive pressure-sensitive adhesive (3) having a thickness of 50 μm was produced.

The elongation, tensile modulus of elasticity, 90-degree peeling adhesive strength, holding force, hardness, thermal conductivity, and thermal resistance of the resultant heat-conductive pressure-sensitive adhesive (3) are shown in Table 3.

(Production of Resin Sheet (3) with Pressure-Sensitive Adhesive Layer)

The resultant resin sheet (3) and the heat-conductive pressure-sensitive adhesive (3) were superimposed on each other, and were passed through a space between the resin rolls of a small laminator in which a press pressure was adjusted to 0.2 MPa at a speed of 2 m/min to provide a resin sheet (3) with a pressure-sensitive adhesive layer.

Various results of the resin foam (3) and the resin sheet (3) with a pressure-sensitive adhesive layer thus obtained are shown in Table 1.

Example 4

100 Parts by weight of linear low-density polyethylene ("KERNEL KF370" manufactured by Japan Polyethylene Corporation, density: 0.905 g/cm$^3$, melting point (DSC method) Tm: 97° C.) serving as a polyolefin-based resin, 15 parts by weight of azodicarbonamide serving as a thermal decomposition-type foaming agent, and 2.0 parts by weight of zinc oxide serving as a decomposition temperature-adjusting agent were supplied to an extruder, and were melted and kneaded at 130° C. to extrude an elongate sheet-shaped polyolefin-based resin composition having a thickness of about 0.3 mm. Next, electron beams each having an acceleration voltage of 500 kV were applied in a quantity of 5.0 Mrad to both surfaces of the resultant elongate sheet-shaped polyolefin-based resin composition to cross-link the composition. After that, the cross-linked product was continuously fed into a foaming furnace, which was held at 250° C. by hot air and an infrared heater, to be heated and foamed. In addition, the cross-linked product was stretched at a stretching ratio in its MD of 3.0 times and at a stretching ratio in its TD of 2.0 times while being foamed. Thus, a resin sheet (4) formed of a resin foam (4) having a thickness of 0.2 mm was obtained.

The evaluation results of the resin foam (4) and the resin sheet (4) thus obtained are shown in Table 1.

Example 5

100 Parts by weight of a block copolymer of polybutylene terephthalate serving as a hard segment and polyether serving as a soft segment (product name: "PELPRENE P-90BD", manufactured by Toyobo Co., Ltd., melt flow rate at 230° C.: 3.0 g/10 min), 3 parts by weight of an acrylic lubricant (product name: "METABLEN L-1000", manufactured by Mitsubishi Rayon Co., Ltd.), 0.5 part by weight of hard clay subjected to a surface treatment with a silane coupling agent (product name: "ST-301", manufactured by Shiraishi Calcium Kaisha, Ltd.), 5 parts by weight of carbon black (product name: "ASAHI #35", manufactured by Asahi Carbon Co., Ltd.), and 1 part by weight of an epoxy-based acrylic resin (epoxy-modified acrylic polymer, weight-average molecular weight: 50,000, epoxy equivalent: 1,200 g/eq, viscosity: 2,850 mPa·s) were kneaded with a biaxial kneader (manufactured by the Japan Steel Works, Ltd. (JSW)) at a temperature of 220° C. After that, the kneaded product was extruded into a strand shape, and was cooled with water, followed by cutting and forming into a pellet shape. Thus, a pellet-shaped resin composition was obtained.

The pellet-shaped resin composition was loaded into a monoaxial extruder (manufactured by the Japan Steel Works, Ltd. (JSW)), and in an atmosphere at 240° C., a carbon dioxide gas was injected into the pellet-shaped resin composition at a pressure of 17 (13 after the injection) MPa and at a ratio of 3.3 wt % with respect to the total amount (100 wt %) of the pellet-shaped resin composition. After the carbon dioxide gas had been sufficiently saturated, the composition was cooled to a temperature suitable for foaming, and was extruded from a die. The cylindrical foam was passed through a space between a mandrel configured to cool the inner surface of a foam and an air ring for cooling a foam configured to cool the outer surface of the cylindrical foam extruded from the annular die of the extruder, and part of its diameter was cut to develop the foam into a sheet shape. Thus, an elongate foam raw material was obtained. The elongate foam raw material was cut into a predetermined width (slitting), and a low-foaming layer on its surface was peeled off one by one with a continuous slicing apparatus (slicing line). Thus, a resin foam (5) (thickness: 0.30 mm) was obtained.

One surface of the resin foam (5) was subjected to a melting treatment with heat by passing the foam through the inside of a continuous treating apparatus in which the temperature of each of induction heat generation rolls was set to 200° C., and a gap therebetween was set to 0.20 mm. Thus, a resin sheet (5) having a thickness of 0.2 mm was obtained. The take-up speed of the sheet was set to 20 m/min.

The evaluation results of the resin foam (5) and the resin sheet (5) thus obtained are shown in Table 1.

Example 6

40 Parts by weight of an EPDM ("EPT3045", manufactured by Mitsui Chemicals, Inc., diene content: 4.7 wt %), 60 parts by weight of an EPDM ("EP-24", manufactured by JSR Corporation, diene content: 4.5 wt %), 15 parts by weight of carbon black ("ASAHI #50", manufactured by Asahi Carbon Co., Ltd.) serving as a pigment, 4 parts by weight of zinc oxide (manufactured by Mitsui Mining & Smelting Co., Ltd.) serving as a vulcanization aid, 5 parts by weight of stearic acid ("POWDER STEARIC ACID SAKURA", manufactured by NOF Corporation) serving as a lubricant, 120 parts by weight of calcium carbonate ("N HEAVY CALCIUM CARBONATE", manufactured by Maruo Calcium Co., Ltd.) serving as a filler, 10 parts by weight of a paraffin ("PARAPERE 130", manufactured by Taniguchi Oil Corporation, melting point: 54.4° C. to 57.2° C., penetration degree: 50 or less) serving as a softening agent, 100 parts by weight of blown asphalt 10-20 (manufactured by Nippon Oil Corporation, softening point: 135° C. to 142° C., penetration degree (25° C.): 10 to 20) serving as asphalt, 40 parts by weight of a paraffin-based process oil (DIANA PROCESS OIL PW-90, manufactured by Idemitsu Kosan Co., Ltd., density: 0.85 g/cm$^3$ to 0.89 g/cm$^3$, kinematic viscosity (40° C.): 75.0 cSt to 105.0 cSt) serving as a paraffin-based oil, and 1 part by weight of a thiourea-based vulcanization accelerator (N,N'-dibutyl thiourea, "NOCCELER BUR", manufactured by Ouchi Shinko Chemical Industrial Co., Ltd.) serving as a vulcanization accelerator were compounded with each other, and were kneaded with a 3-liter pressurizing kneader to prepare a primary mixture.

Separately, 1 part by weight of sulfur ("ALPHAGRAN S-50EN", manufactured by Touchi Co., Ltd.) serving as a vulcanizing agent, 0.5 part by weight of a thiazole-based vulcanization accelerator (2-mercaptobenzothiazole, "NOCCELER M", manufactured by Ouchi Shinko Chemical Industrial Co., Ltd.) serving as a vulcanization accelerator, 0.2 part by weight of a dithiocarbamic acid-based vulcanization accelerator (zinc dibenzyl dithiocarbamate, "NOCCELER ZTC", manufactured by Ouchi Shinko Chemical Industrial Co., Ltd.) serving as a vulcanization accelerator, 0.5 part by weight of a thiuram-based vulcanization accelerator (tetrabenzylthiuram disulfide, "NOCCELER TBzTD", manufactured by Ouchi Shinko Chemical Industrial Co., Ltd.) serving as a vulcanization accelerator, 18 parts by weight of azodicarbonamide (ADCA, "AC #LQ", manufactured by Eiwa Chemical Ind. Co., Ltd.) serving as a foaming agent, and 2 parts by weight of a urea-based foaming aid ("CELLPASTE K5", manufactured by Eiwa Chemical Ind. Co., Ltd.) serving as a foaming aid were compounded with each other.

After that, the resultant compounded product was compounded into the primary mixture, and the resultant was kneaded with a 10-inch mixing roll to prepare a foam composition (secondary mixture) (preparing step). Next, the foam composition was extruded into a sheet shape having a thickness of about 8 mm with a uniaxial extrusion molding machine (45 mmφ). Thus, a foam composition sheet was produced (forming step). Then, the foam composition sheet was preheated in a hot air-circulating oven at 120° C. for 20 minutes. After that, the temperature of the hot air-circulating oven was increased to 160° C. over 10 minutes, and the foam composition sheet was heated at 160° C. for 20 minutes to be vulcanized and foamed (foaming step). Thus, a foam raw material was obtained. The foam raw material was cut into a predetermined width (slitting), and a low-foaming layer on its surface was peeled off one by one with a continuous slicing apparatus (slicing line). Thus, a resin sheet (6) formed of a resin foam (6) (thickness: 0.20 mm) was obtained.

The evaluation results of the resin foam (6) and the resin sheet (6) thus obtained are shown in Table 1.

Example 7

52 Parts by weight of polypropylene (melt flow rate (MFR): 0.35 g/10 min), 48 parts by weight of the mixture of a thermoplastic olefin-based elastomer (ethylene-propylene copolymer elastomer) and a softening agent (paraffin-based extender oil) (MFR (230° C.) 6 g/10 min, JIS A hardness: 79°, obtained by compounding 100 parts by weight of the polyolefin-based elastomer with 30 parts by weight of the softening agent), 5 parts by weight of carbon black (product name: "ASAHI #35", manufactured by Asahi Carbon Co., Ltd.), 10 parts by weight of magnesium hydroxide, 3 parts by weight of stearic acid monoglyceride, and 1 part by weight of a fatty acid amide (lauric acid bisamide) were kneaded with a biaxial kneader manufactured by the Japan Steel Works, Ltd. (JSW) at a temperature of 200° C. After that, the kneaded product was extruded into a strand shape, and was cooled with water, followed by forming into a pellet shape. The pellet was loaded into a monoaxial extruder manufactured by the Japan Steel Works, Ltd., and under an atmosphere at 220° C., a carbon dioxide gas was injected into the pellet at a pressure of 13 (12 after the injection) MPa. The carbon dioxide gas was injected at a ratio of 5.6 wt % with respect to the total amount of the pellet. After the carbon dioxide gas had been sufficiently saturated, the pellet was cooled to a temperature suitable for foaming, and was extruded from a die into a cylindrical shape. The cylindrical foam was passed through a space between a mandrel configured to cool the inner surface of a foam and an air ring for cooling a foam configured to cool the outer surface of the cylindrical foam extruded from the annular die of the extruder, and part of its diameter was cut to develop the foam into a sheet shape. Thus, an elongate foam raw material was obtained. The elongate foam raw material was cut into a predetermined width (slitting), and a low-foaming layer on its surface was peeled off one by one with a continuous slicing apparatus (slicing line). Thus, a resin foam (7) (thickness: 0.20 mm) was obtained.

The resultant resin foam (7) was used as it was as a resin sheet (7).

Various results of the resin foam (7) and the resin sheet (7) thus obtained are shown in Table 2.

Example 8

The resin sheet (7) (i.e., the resin foam (7)) obtained in Example 7 and the heat-conductive pressure-sensitive adhesive (3) obtained in Example 3 were superimposed on each other, and were passed through a space between the resin rolls of a small laminator in which a press pressure was adjusted to 0.2 MPa at a speed of 2 m/min to provide a resin sheet (8) with a pressure-sensitive adhesive layer.

Various results of the resin foam (7) and the resultant resin sheet (8) with a pressure-sensitive adhesive layer are shown in Table 2.

Example 9

52 Parts by weight of polypropylene (melt flow rate (MFR): 0.35 g/10 min), 48 parts by weight of the mixture of a thermoplastic olefin-based elastomer (ethylene-propylene copolymer elastomer) and a softening agent (paraffin-based extender oil) (MFR (230° C.) 6 g/10 min, JIS A hardness: 79°, obtained by compounding 100 parts by weight of the polyolefin-based elastomer with 30 parts by weight of the softening agent), 5 parts by weight of carbon black (product name: "KETCHEN BLACK EC-600JD", particle diameter D50=0.04 μm, hollow shell structure, BET specific surface area=1,270 m$^2$/g, manufactured by Lion Specialty Chemicals Co., Ltd.), 7 parts by weight of a carbon nanotube (product name: "K-Nanos 100P", tube diameter=10 nm, tube length=1.5 μm, aspect ratio=150, manufactured by Korea Kumho Petrochemical Co., Ltd.), 10 parts by weight of magnesium hydroxide, and 1 part by weight of stearic acid monoglyceride were kneaded with a biaxial kneader manufactured by the Japan Steel Works, Ltd. (JSW) at a temperature of 200° C. After that, the kneaded product was extruded into a strand shape, and was cooled with water, followed by forming into a pellet shape. The pellet was loaded into a monoaxial extruder manufactured by the Japan Steel Works, Ltd., and under an atmosphere at 220° C., a carbon dioxide gas was injected into the pellet at a pressure of 13 (12 after the injection) MPa. The carbon dioxide gas was injected at a ratio of 5.6 wt % with respect to the total amount of the pellet. After the carbon dioxide gas had been sufficiently saturated, the pellet was cooled to a temperature suitable for foaming, and was extruded from a die into a cylindrical shape. The cylindrical foam was passed through a space between a mandrel configured to cool the inner surface of a foam and an air ring for cooling a foam configured to cool the outer surface of the cylindrical foam extruded from the annular die of the extruder, and part of its diameter was cut to develop the foam into a sheet shape. Thus, an elongate foam raw material was obtained. The elongate foam raw material was cut into a predetermined width (slitting), and a low-foaming layer on its surface was peeled off one by one with a continuous slicing apparatus (slicing line). Thus, a resin foam (9) (thickness: 0.30 mm) was obtained.

One surface of the resin foam (9) was subjected to a melting treatment with heat by passing the foam through the inside of a continuous treating apparatus in which the temperature of each of induction heat generation rolls was set to 200° C., and a gap therebetween was set to 0.2 mm. Thus, a resin sheet (9) was obtained. The take-up speed of the sheet was set to 20 m/min.

Various results of the resin foam (9) and the resin sheet (9) thus obtained are shown in Table 2.

Example 10

The resin sheet (9) (i.e., the resin foam (9)) obtained in Example 9 and the heat-conductive pressure-sensitive adhesive (3) obtained in Example 3 were superimposed on each other, and were passed through a space between the resin rolls of a small laminator in which a press pressure was adjusted to 0.2 MPa at a speed of 2 m/min to provide a resin sheet (10) with a pressure-sensitive adhesive layer.

Various results of the resin foam (9) and the resultant resin sheet (10) with a pressure-sensitive adhesive layer are shown in Table 2.

Example 11

100 Parts by weight of an acrylic emulsion solution (solid content: 55%, ethyl acrylate-butyl acrylate-acrylonitrile copolymer (weight ratio: 45:48:7)), 1.6 parts by weight of a fatty acid ammonium-based surfactant (water dispersion of ammonium stearate, solid content: 33%) (surfactant A), 1.6 parts by weight of a carboxybetaine-type amphoteric surfactant ("AMOGEN CB-H", manufactured by DKS Co., Ltd.) (surfactant B), 6 parts by weight of an oxazoline-based cross-linking agent ("EPOCROS WS-500", manufactured by Nippon Shokubai Co., Ltd., solid content: 39%), 2 parts by weight of a pigment (carbon black) ("NAF-5091", manufactured by Dainichiseika Color & Chemicals Mfg. Co., Ltd.), and 0.8 part by weight of a polyacrylic acid-based thickener (ethyl acrylate-acrylic acid copolymer (acrylic acid: 20 wt %), solid content: 28.7%) were stirred and mixed with a disper ("ROBOMIX", manufactured by Primix Corporation) to be foamed. The foam composition was applied onto a release-treated polyethylene terephthalate (PET) film (thickness: 38 μm, product name: "MRF #38", manufactured by Mitsubishi Plastics, Inc.), and was dried at 70° C. for 4.5 minutes and at 140° C. for 4.5 minutes. Thus, a resin foam (11) (thickness: 0.20 mm) was obtained.

The resultant resin foam (11) was used as it was as a resin sheet (11).

Various results of the resin foam (11) and the resin sheet (11) thus obtained are shown in Table 2.

Example 12

The resin sheet (11) (i.e., the resin foam (11)) obtained in Example 11 and the heat-conductive pressure-sensitive adhesive (3) obtained in Example 3 were superimposed on each other, and were passed through a space between the resin rolls of a small laminator in which a press pressure was adjusted to 0.2 MPa at a speed of 2 m/min to provide a resin sheet (12) with a pressure-sensitive adhesive layer.

Various results of the resin foam (11) and the resultant resin sheet (12) with a pressure-sensitive adhesive layer are shown in Table 2.

Comparative Example 1

Eight commercial graphite sheets (product name: "GRAPHINITY 25 μm", manufactured by Kaneka Corporation, thickness: 25 μm) were laminated to provide a sheet (C1).

The evaluation results of the resultant sheet (C1) are shown in Table 2.

TABLE 1

|  |  | Example 1 Polypropylene-based foam | Example 2 Polypropylene-based foam | Example 3 Polypropylene-based foam | Example 4 Polyethylene-based foam | Example 5 Polyester based foam | Example 6 EPDM-based foam |
|---|---|---|---|---|---|---|---|
| Kind of foam |  |  |  |  |  |  |  |
| Foaming method |  | Physical foaming | Physical foaming | Physical foaming | Chemical foaming | Physical foaming | Chemical foaming |
| Thickness of foam (mm) |  | 0.2 | 0.2 | 0.2 | 0.2 | 0.2 | 0.2 |
| Thickness of pressure-sensitive adhesive layer (mm) |  | — | — | 0.05 | — | — | — |
| 50% Compression load (N/cm$^2$) |  | 1.6 | 1.7 | 1.6 | 16.5 | 2.3 | 4.6 |
| Poisson's ratio |  | 0.00 | 0.00 | 0.00 | 0.05 | 0.03 | 0.03 |
| Thickness recovery ratio (%) |  | 85 | 86 | 85 | 55 | 92 | 62 |
| Cell wall ratio (%) |  | 56 | 55 | 56 | 19 | 34 | 10 |
| Average cell diameter (μm) |  | 85 | 82 | 85 | 226 | 136 | 471 |
| Apparent density (g/cm$^3$) |  | 0.06 | 0.07 | 0.06 | 0.31 | 0.12 | 0.10 |
| Thermal conductivity of foam (W/m·K) |  | 0.21 | 0.21 | 0.21 | 0.08 | 0.18 | 0.34 |
| Evaluation of partial heatability (° C.) | A | 63.9 | 63.8 | 63.1 | 62.1 | 62.3 | 61.9 |
|  | B | 63.5 | 63.5 | 62.7 | 61.4 | 62.3 | 61.1 |
|  | A-B | 0.4 | 0.3 | 0.4 | 0.7 | 0.0 | 0.8 |

TABLE 2

| Kind of foam | Example 7 Polypropylene-based foam | Example 8 Polypropylene-based foam | Example 9 Polypropylene-based foam | Example 10 Polypropylene-based foam | Example 11 Acrylic foam | Example 12 Acrylic foam | Comparative Example 1 Graphite sheet (non-foamed body) |
|---|---|---|---|---|---|---|---|
| Foaming method | Physical foaming | Physical foaming | Physical foaming | Physical foaming | Physical foaming | Physical foaming | — |
| Thickness of foam (mm) | 0.2 | 0.2 | 0.2 | 0.2 | 0.2 | 0.2 | 0.2 (non-foamed |
| Thickness of pressure-sensitive adhesive layer (mm) | — | 0.05 | — | 0.05 | — | 0.05 |  |
| 50% Compression load (N/cm$^2$) | 1.5 | 1.7 | 3.0 | 3.3 | 6.0 | 6.8 | Unable to compress |
| Poisson's ratio | 0.00 | 0.00 | 0.00 | 0.00 | 0.00 | 0.00 | Unable to |
| Thickness recovery ratio (%) | 87 | 84 | 83 | 80 | 94 | 94 | 0 |
| Cell wall ratio (%) | 48 | 48 | 40 | 40 | 60 | 60 | 0 |
| Average cell diameter (μm) | 81 | 81 | 107 | 107 | 56 | 56 | 0 |
| Apparent density (g/cm$^3$) | 0.04 | 0.04 | 0.05 | 0.05 | 0.28 | 0.28 | 1.1 |

TABLE 2-continued

| Kind of foam | | | Example 7 Polypropylene-based foam | Example 8 Polypropylene-based foam | Example 9 Polypropylene-based foam | Example 10 Polypropylene-based foam | Example 11 Acrylic foam | Example 12 Acrylic foam | Comparative Example 1 Graphite sheet (non-foamed body) |
|---|---|---|---|---|---|---|---|---|---|
| Thermal conductivity of foam (W/m·K) | | | 0.19 | 0.19 | 0.23 | 0.23 | 0.20 | 0.20 | — |
| Evaluation of partial heatability (° C.) | A | | 63.5 | 62.8 | 63.1 | 62.6 | 64.0 | 63.6 | 64.5 |
| | B | | 63.1 | 62.5 | 62.8 | 62.2 | 63.5 | 63.2 | 62.2 |
| | A-B | | 0.4 | 0.3 | 0.3 | 0.4 | 0.5 | 0.4 | 2.3 |

TABLE 3

| | Characteristic | |
|---|---|---|
| Heat conductive pressure-sensitive adhesive (3) | Viscosity of pressure-sensitive adhesive raw material (Pa · s) | 15 |
| | Tensile modulus of elasticity (MPa) | 0.55 |
| | Elongation (%) | 1,630 |
| | 90-Degree peeling adhesive strength (N/20 mm) | 11 |
| | Hardness | 43 |
| | Holding force (shift width mm) | 0.2 |
| | Thermal conductivity (W/m · K) | 0.8 |
| | Thermal resistance (cm² · K/W) | 0.7 |

INDUSTRIAL APPLICABILITY

The resin sheet and resin sheet with a pressure-sensitive adhesive layer of the present invention may each be utilized as, for example, a thermal conductor to be arranged between a heat-generating part and a casing.

REFERENCE SIGNS LIST

1000 resin sheet
100 main surface A
200 main surface B

The invention claimed is:

1. A resin sheet, comprising a resin foam and having a main surface A and a main surface B opposite to each other across a thickness "d",
wherein the resin sheet has a thermal conductivity of from 0.08 W/m·K to 0.35 W/m·K;
wherein the resin sheet has a 50% compression load of 20 N/cm² or less at 23±5° C. in a direction of the thickness "d", which is measured in conformity with a method of measuring a compression hardness described in JIS K 6767:1999;
wherein the resin sheet has a Poisson's ratio at 23° C. of 0.10 or less; and
wherein the resin sheet has a thickness recovery ratio of 40% or more when compressed by 20% in the direction of the thickness "d" at 23° C.

2. The resin sheet according to claim 1, wherein the resin foam contains at least one selected from polyethylene, polypropylene, polyester, an EPDM, and an acrylic resin.

3. The resin sheet according to claim 1, wherein the resin foam is formed by a foaming method that comprises at least one selected from a chemical foaming method and a physical foaming method.

4. The resin sheet according to claim 1, wherein the resin sheet has a cell wall ratio of from 5% to 80%.

5. The resin sheet according to claim 1, wherein the resin sheet has an average cell diameter of from 40 μm to 500 μm.

6. The resin sheet according to claim 1, wherein the resin sheet has an apparent density of from 0.01 g/cm³ to 0.5 g/cm³.

7. A resin sheet with a pressure-sensitive adhesive layer, comprising:
the resin sheet of claim 1; and
a pressure-sensitive adhesive layer.

* * * * *